United States Patent [19]

Matsuda et al.

[11] Patent Number: 5,032,995
[45] Date of Patent: Jul. 16, 1991

[54] FAIL-SAFE DRIVING TORQUE DISTRIBUTION CONTROL SYSTEM FOR 4WD VEHICLE

[75] Inventors: Toshiro Matsuda, Sagamihara; Terukiyo Kitamura, Tokyo; Koji Morita, Fujisawa, all of Japan

[73] Assignee: Nissan Motor Co., Ltd., Yokohama, Japan

[21] Appl. No.: 400,538

[22] Filed: Aug. 31, 1989

[30] Foreign Application Priority Data

Aug. 31, 1988 [JP] Japan .................................. 63-217744

[51] Int. Cl.⁵ .............................................. B60K 17/34
[52] U.S. Cl. .............................. 364/424.03; 364/424.1; 180/233
[58] Field of Search ...................... 364/424.05, 424.03, 364/424.1, 426.03; 180/247, 248, 249, 250, 197, 233

[56] References Cited

U.S. PATENT DOCUMENTS

| | | | |
|---|---|---|---|
| 4,699,236 | 10/1987 | Morisawa et al. | 180/249 |
| 4,702,341 | 10/1987 | Taga et al. | 180/249 |
| 4,744,437 | 5/1988 | Matsumoto | 180/249 |
| 4,754,835 | 7/1988 | Stelter et al. | 180/248 |
| 4,867,262 | 9/1989 | Takada et al. | 180/249 |
| 4,874,056 | 10/1989 | Naito | 180/233 |
| 4,887,689 | 12/1989 | Naito | 180/233 |
| 4,912,639 | 3/1990 | Kawamoto | 180/248 |

FOREIGN PATENT DOCUMENTS 0280544 8/1988 European Pat. Off. .
0311140 4/1989 European Pat. Off. .
2192159 1/1988 United Kingdom .

*Primary Examiner*—Gary Chin
*Attorney, Agent, or Firm*—Foley & Lardner

[57] ABSTRACT

A fail-safe control system includes one or more circuits for detecting failures in sensors and an actuator of a driving force distribution control system of a 4WD vehicle, and a fail-safe means which, if a failure is detected, gradually disengage a transfer clutch until the 2WD state is reached, in such a gradual manner as to prevent spin or drift-out of the vehicle. The fail-safe means may decrease the magnitude of an electric control signal gradually, or may employ a fail-safe valve for gradually decreasing a fluid pressure supplied to the transfer clutch.

15 Claims, 15 Drawing Sheets

5,032,995

FAIL-SAFE DRIVING TORQUE DISTRIBUTION CONTROL SYSTEM FOR 4WD VEHICLE

REFERRENCES TO RELATED CASES

The following, commonly assigned United States Patents and Applications relates to driving force distribution control systems similar to that of the present invention.

(1) U.S. Pat. No. 4,757,870; (2) U.S. Pat. No. 4,754,834; (3) U.S. Pat. No. 4,773,500; (4) U.S. Pat. No. 4,776,424; (5) U.S. application Ser. No. 07/127,319; filed Dec. 2, 1987; (6) U.S. application Ser. No. 07/277,746; filed Nov. 30, 1988; (7) U.S. application Ser. No. 07/254,626; filed Oct. 7, 1988; (8) U.S. application Ser. No. 07/254,875; filed Oct. 7, 1988; (9) U.S. application Ser. No. 07/255,820; filed Oct. 11, 1988; (10) U.S. application Ser. No. 07/277,377; filed Nov. 29, 1988; (11) U.S. application Ser. No. 07/255,939; filed Oct. 11, 1988; and (12) U.S. application Ser. No. 400536 to be filed concurrently with this application, based on Japanese Patent Application No. 63-217743 (Our case No. 088-89).

BACKGROUND OF THE INVENTION

The present invention relates to a driving torque (or driving force) distribution control system for a four wheel driving vehicle, and more specifically to a fail-safe control system which can maintain the stability of the vehicle even when a driving force distribution control system fails.

Japanese Patent Provisional Publication No. 62-46716 discloses one conventional example. A control system of this example is designed to change the four wheel drive system to the 2WD state when an abnormal condition is detected. In the two wheel drive state, all the driving torque is applied only to the rear wheels, and the rear wheel cornering force is decreased. Therefore, an abrupt change from the 4WD state to the rear two wheel drive state is liable to cause a spin of the vehicle especially when the change is made during a cornering operation near the critical lateral acceleration. In the vehicle in which all the driving torque is transmitted to the front wheels in the 2WD state, an abrupt change from the 4WD state to the two wheel drive state is liable to cause a drift-out of the vehicle due to decrease in the front wheel cornering force.

SUMMARY OF THE INVENTION

It is therefore an object of the present invention to provide a driving torque distribution control system which can maintain the safety and stability of the vehicle by preventing dangerous spin or drift-out when a failure occurs in the system.

According to the present invention, a fail-safe driving force distribution control system for a vehicle, comprises a basic controlling means for varying a distribution of a driving force produced by a prime mover of the vehicle between front and rear axles of the vehicle, a failure detecting means for producing a failure detection signal when a failure occurs in the basic controlling means, and a fail-safe means for gradually varying the distribution of the driving force to a predetermined fail-safe state. These means are schematically shown in FIG. 1.

The basic controlling means may comprise a transfer clutch capable of continuously varying the driving force distribution by continuously varying a clutch engagement force, an actuator means for varying the engagement force of the clutch in response to a control signal, and a controller means for producing the control signal to control the disbribution of the driving force.

DETAILED DESCRIPTION OF THE INVENTION

A first embodiment of the present invention is shown in FIGS. 2 to 14.

Figure 1:
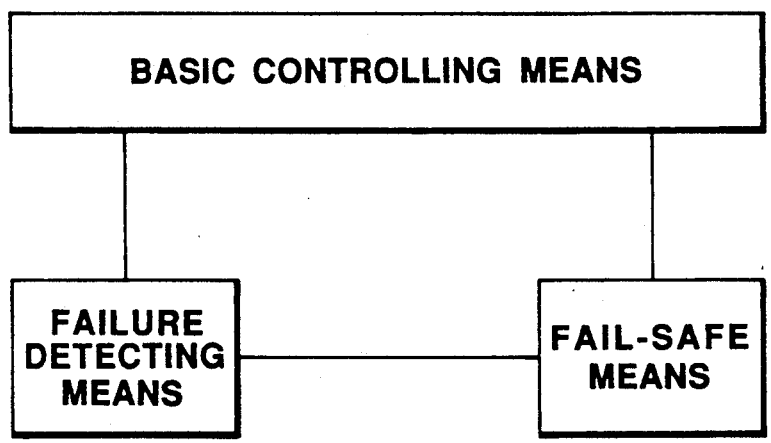
FIG. 1 is a block diagram schematically showing, as an example, an arrangemnt of basic components used in the present invention.
Figure 2:
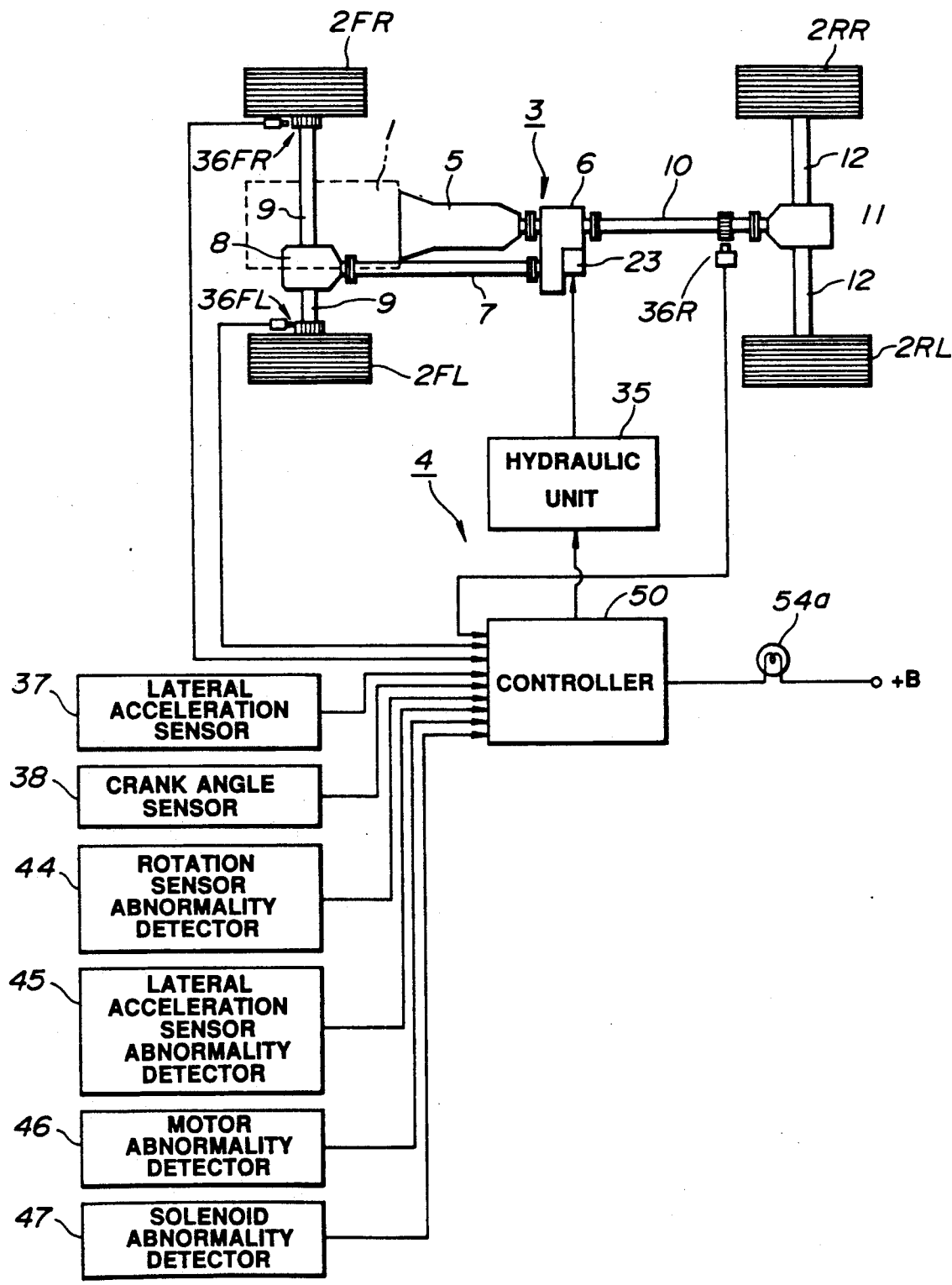
FIG. 2 is a schematic view of a vehicle equipped with a driving force distribution control system according to a first embodiment of the present invention.

A 4WD vehicle shown in FIG. 2 is based on a front engine rear wheel drive vehicle, and has an engine 1, left and right front wheels 2FL and 2FR, left and right rear wheels 2RL and 2RR, a drive system 3 capable of continuously varying a driving force distribution between the front and rear axles, and a driving torque distribution controlling system 4.

The drive system 3 includes a transmission 5 for varying a gear ratio between input and output speeds, and a transfer 6 for distributing the driving force (torque) transmitted from the engine 1 through the transmission 5, between the front and rear wheels. In the first embodiment (as well as in the other embodiments shown in FIGS. 15–18), the rear wheels 2RL and 2RR are primary driving wheels which are always in driving connection with an output shaft of the transmission 5, and the front wheels 2FL and 2FR are secondary driving wheels which can be disconnected from the transmission 5 by the transfer 6.

From the transfer 6, a front wheel driving force (torque) is transmitted through a front drive shaft 7, a front differential gear 8, front wheel axle shafts 9 to the front wheels 2FL and 2FR. A rear wheel driving force (torque) is transmitted from the transfer 6, through a rear drive shaft (propeller shaft) 10, a rear differential gear 11, and rear wheel axle shafts 12, to the rear wheels 2RL and 2RR.

Figure 3:
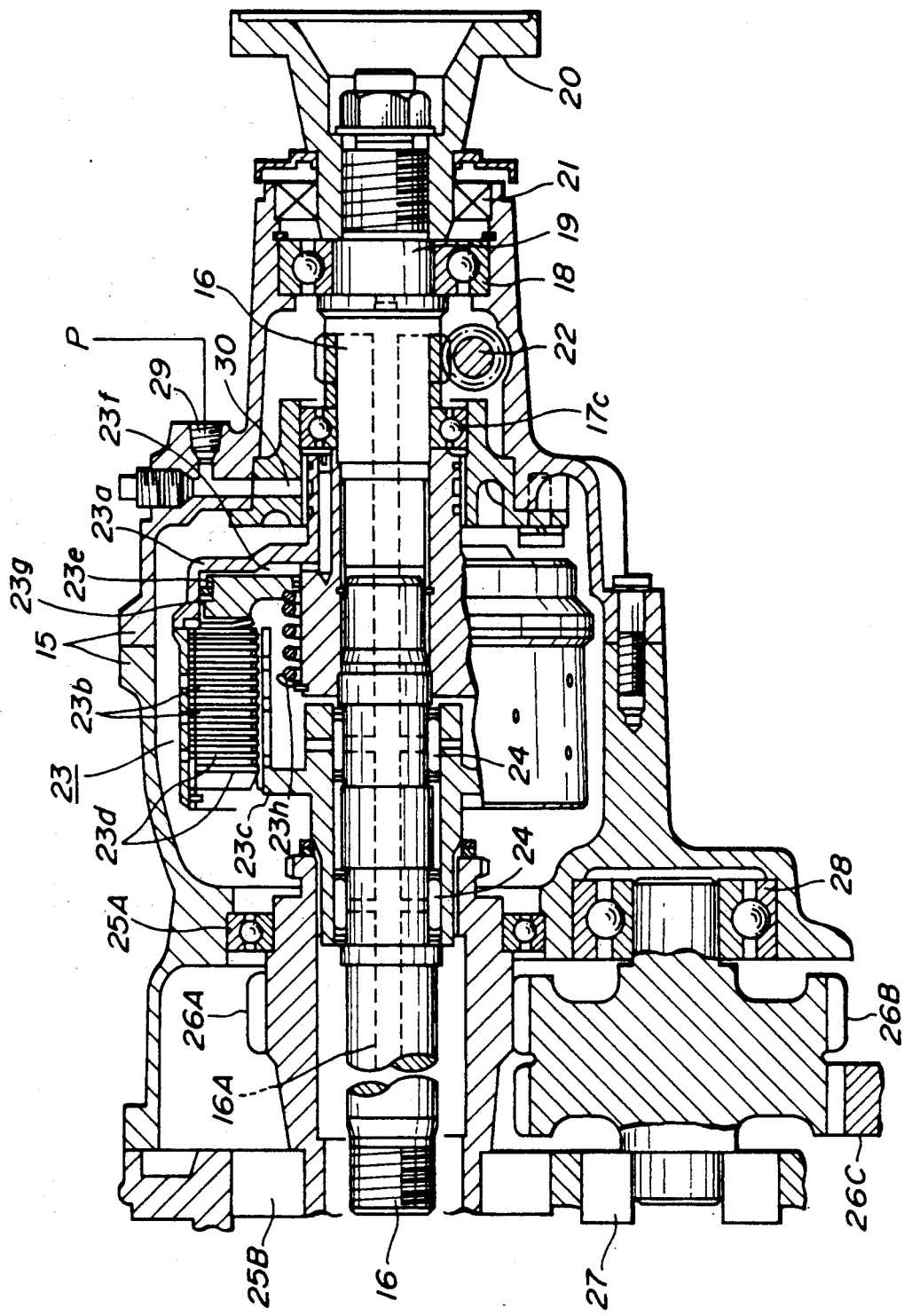
FIG. 3 is a schematic sectional view of a transfer 6 employed in the vehicle shown in FIG. 2.
Figure 4:
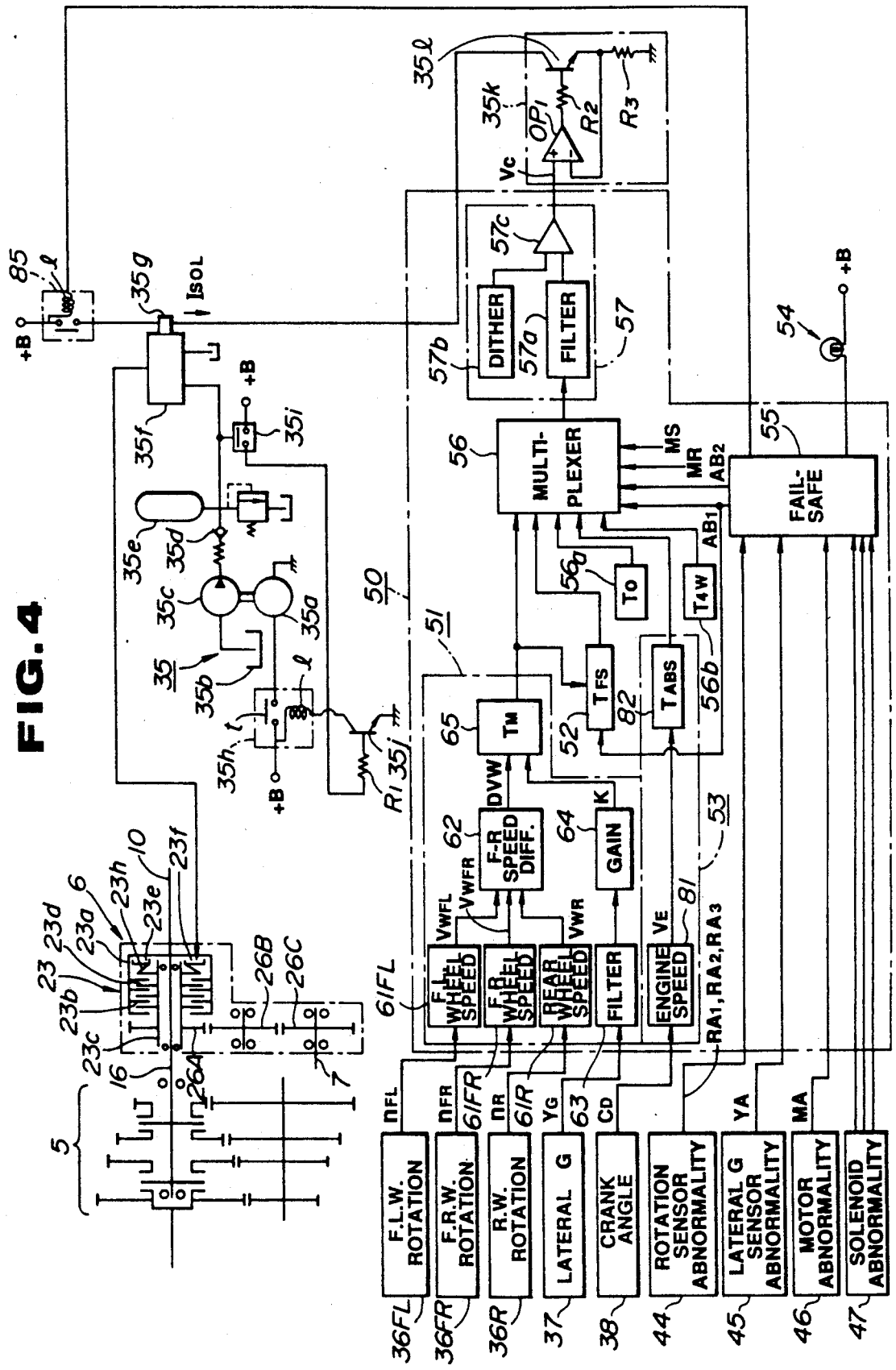
FIG. 4 is a block diagram showing a controller 50 and other components constituting the distribution control system of the first embodiment.

As shown in FIGS. 3 and 4, the transfer 6 has a transfer case 15, and an input shaft 16 which is rotatably supported by bearings 17 within the transfer case. One end of the input shaft 16 is connected with an output member of the transmission 5, and the other end is connected with an output shaft 19 of the transfer 6. The output shaft 19 is rotatably supported by one or more bearings 18 in the transfer case 15, and drivingly connected with the rear drive shaft 10. There are further provided an oil passage 16A, a coupling flange splined to the output shaft 19, an oil seal 31 and a speedometer pinion 22.

The transfer 6 further includes a transfer clutch 23 capable of continuously varying a driving torque distribution between the front and rear axles. In this embodiment, the transfer clutch 23 is a wet type multiple disc clutch.

The transfer clutch 23 has a clutch drum 23a splined to the input shaft 16, a friction plates 23b engaged with the clutch drum 23a, a clutch hub 23c rotatably mounted on the input shaft 16 through needle bearings 24, friction discs 23d engaged with the clutch hub 23c, a clutch piston 23e provided on one side of the alternating pack of the friction plates and discs 23b and 23d, and a cylinder chamber 23f formed between the piston 23e and the clutch drum 23a. The transfer clutch 23 further includes a dish plate 23g and a return spring 23h acting against the clutch piston 23e.

The transfer 6 further includes a gear train through which the transfer clutch 23 is connected with the front drive shaft 7. The gear train includes a first gear 26A which is rotatably supported by beraings 25A and 25B and splined to the clutch hub 23c, a second gear 26B which is rotatably supported by bearings 27 and 28 and in engagement with the first gear 25A, and a third gear 26C through which the second gear 26B is connected with the front drive shaft 7.

The transfer case 15 is formed with an input port 29 for receiving a clutch oil pressure. The input port 29 is connected with the cylinder chamber 23f of the transfer clutch 23 through an oil pasage 30 formed in the transfer case 15 and the clutch drum 23a.

Figure 5:
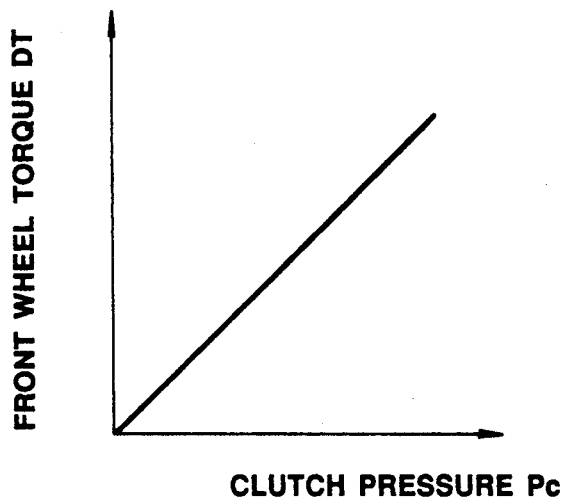
FIG. 5 is a graph showing a relationship between a driving torque transmitted to front wheels through the transfer 6 of the first embodiment, and a clutch fluid pressure supplied to a clutch of the transfer.

When the fluid pressure is null in the cylinder chamber 23f, the friction plates and discs 23b and 23d are disengaged by the aid of the return spring 23h. In this state, all the input torque transmitted from the engine 1 to the input shaft 16 of the transfer 6 is transmitted to the rear wheels through the rear drive shaft 10, and none is transmitted to the front wheels. This state is a complete 2WD state. When a control oil pressure is supplied through the input port 29 to the cylinder chamber 23f, the clutch piston 23e pushes the pack of the friction plates and discs, and produces a clutch engagement force due to friction between the friction plates and discs 16b and 16d, so that a portion of the input torque is transmitted to the front wheels through the front drive shaft 7. A relationship of a front wheel driving torque DT transmitted to the front wheels through the transfer clutch 23, with respect to an oil pressure P is given by;

$$DT = P \times S \times 2n \times \mu \times r_m \quad (1)$$

where S is a pressure acting area of the piston 23e, n is the number of the friction discs, $\mu$(mu) is a friction coefficient of the clutch plates, and $r_m$ is an effective radius for torque transfer. Thus, the torque DT transmitted through the transfer clutch 23 is substantially proportional to the control oil pressure Pc, as shown in FIG. 5. Therefore, it is possible to continuously vary a driving force (torque) distribution ratio which is a ratio of the front wheel driving torque transmitted to the front wheels to the rear wheel driving torque transmitted to the rear wheels, from a minimum value (0:100, the complete 2WD state) to a maximum value (50:50, the complete 4WD state) by varying the engagement force of the transfer clutch 23.

Similar transfers are disclosed in the before-mentioned U.S. Pat. Nos. 4,757,870; 4,754,834; 4,773,500 and 4,776,424.

The driving force distribution controlling system 4 includes a hydraulic unit 35 for supplying the control fluid pressure Pc to the transfer clutch 23, a group of sensors, and a controller 50. The sensors are front rotation sensors 36FL and 36FR for sensing, respectively, the number of revolutions $n_{FL}$ of the front left wheel 2FL and the number of revolutions $n_{FR}$ of the front right wheel 2FR, a rear rotation sensor 36R for sensing the number of revolutions $n_R$ of the rear wheels 2RL and 2RR by sensing the number of revolutions of the rear drive shaft 10, a lateral acceleration sensor 37Y for sensing a lateral acceleration $Y_G$ of the vehicle body, and a crank angle sensor 38 for sensing a crank angle $C_D$ of the engine 1. Signals produced by these sensors are inputted into the controller 50.

Figure 6:
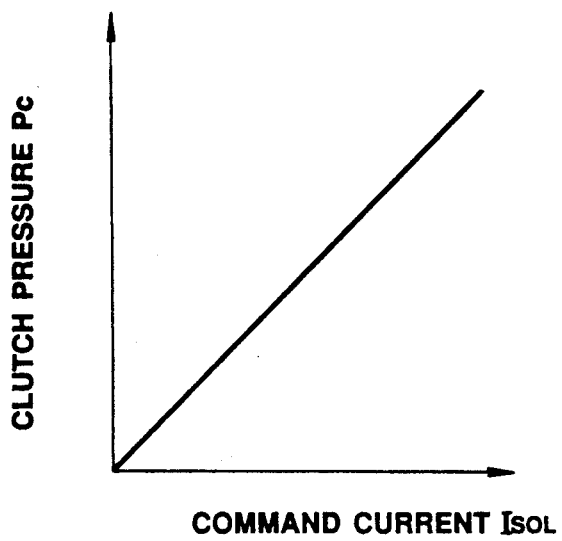
FIG. 6 is a graph showing a relationship between the clutch fluid pressure and a command current supplied to a fluid pressure control valve 35f of the first embodiment.

The hydraulic unit 35 includes an electric motor 35a, and oil tank 35b, and oil pump 35c which is driven by the motor 35a and which is arranged to supply a pressurized oil to the transfer clutch 23 by sucking the oil from the tank 35b, a check valve 35d disposed on the output side of the pump 35c, an accumulator 35e connected to a junction point of an oil passage between the check valve 35d and the transfer clutch 23, and a pressure control valve 35f of an electromagnetic proportional control type, disposed in the oil passage between the above-mentioned junction point and the transfer clutch 23. The pressure control valve 35f varies the control oil pressure Pc supplied to the transfer clutch 23 in accordance with a command current Isol supplied to a proportional control solenoid 35g of the pressure control valve 35f. As shown in FIG. 6, the control pressure Pc in this embodiment varies in proportion to the command current Isol for energizing the control solenoid 35g. One end of a magnetizing winding of the motor 35a is connected through a motor relay 35h to a positive power source B, and the other end of the winding is grounded. The motor relay 35h is controlled by a pressure switch 35i through a switching transistor 35j. The pressure switch 35i is arranged to sense a line pressure in the oil passage between the accumulator 35e and the pressure control valve 35f. The switching transistor 35j has a base which is connected to the positive power source B through a resistor $R_1$ and the pressure switch 35i, a collector which is connected to the positive power source B through a relay coil of the motor relay 35h, and an emitter which is connected to the ground. When the line pressure in the passage between the accumulator 35e and the pressure control valve 35f is equal to or higher than a predetermined pressure, the pressure switch 35i is in an off state to turn off the switching transistor 35j. Therefore, the switching transistor 35j in its off state causes a normally open contact of the motor relay 35h to open, and switches off the electric motor 35a. When the line pressure between the accumulator 35e and the pressure control valve 35f is lower than the predetermined pressure, the pressure switch 35i is put in an on state to turn on the switching transistor 35j. Therefore, the motor relay 35h closes its normally open contact by being energized, and causes the oil pump 35c to increase the line pressure by turning on the electric motor 35a.

A solenoid drive circuit 35k is connected with one end of the control solenoid 35g of the pressure control valve 35f, the other end of which is connected to the positive power source B. The solenoid drive circuit 35k includes an operational amplifier $OP_l$ whose noninverting input is arranged to receive a command voltage $V_c$ from the controller 50, and a power transistor 35l having a base connected through a resistor $R_2$ with the output of the operational amplifier $OP_l$, a collector connected with one end of the solenoid 35g, and an emitter connected to the ground through a resistor $R_3$.

Figure 7:
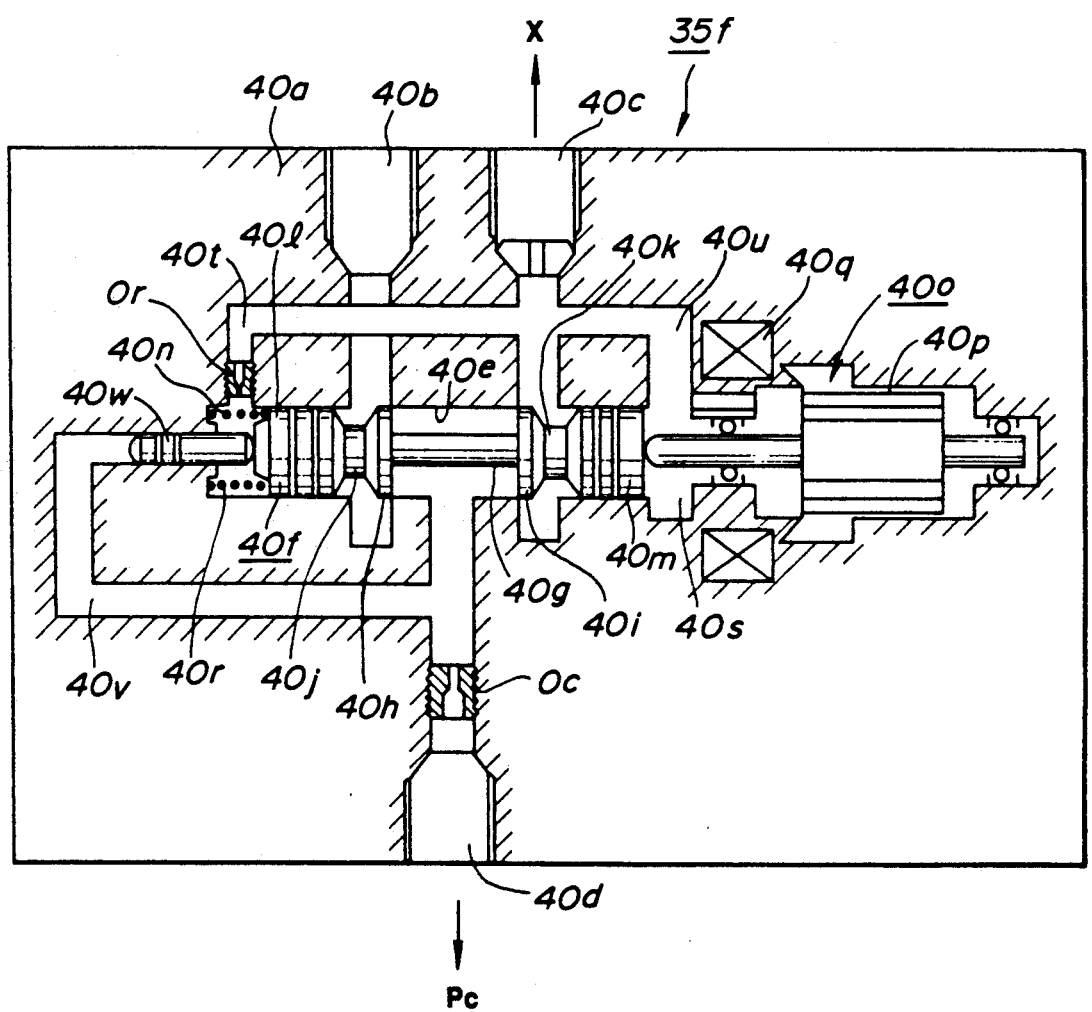
FIG. 7 is a sectional view showing the fluid pressure control valve 35f used in the first embodiment.

A valve shown in FIG. 7 can be used as the control valv 35f. The pressure control valve 35f, as shown in FIG. 7, has a cylindrical valve housing 40a which is formed with an input port 40b, a drain port 40c, a control output port 40d, and a bore 40e communicating with each of the three ports 40b, 40c and 40d, and a spool 40f which is slidably received in the bore 40e. The spool 40f has a small diameter section 40g, two annular grooves 40j and 40k and four large diameter sections 40h, 40i, 40l and 40m. The small diameter section 40g confronts the control ports 40d, and has an axial length equal to the axial distance between the input port 40b and the drain port 40c. The small diameter section 40g is bounded between the large diameter sections 40h and 40i. The annular groove 40j is formed between the large diameter sections 40h and 40l, and the annular groove 40k between the large diameter sections 40i and 40m.

The spool 40f is placed between a return spring 40n and a proportional solenoid 40o. The return spring 40n is disposed between an end of the large diameter section 40l of the spool 40f and an end of the bore 40e. The proportional solenoid 40o adjoins the large diameter section 40m of the spool 40f, and has a plunger 40p and an exciting coil 40q. The plunger 40p is slidable in the bore 40e along the axial line of the spool 40f. The proportional solenoid 40q can produce a pushing force corresponding to the amount of an exciting current. One end (the left end as viewed in FIG. 7) of the plunger 40p abuts on the end surface of the large diameter section 40m of spool 40f.

Oil pressure chambers 40r and 40s are formed on both sides of the spool 40f. The return spring 40n is in the chamber 40r, and the plunger 40p in the chamber 40s. The valve housing 40a is further formed with an oil passage 40t connecting the chamber 40r with the drain port 40c, and an oil passage 40u connecting the chamber 40s with the drain port 40c. An orifice Or is providced in the passage 40t in order to prevent a pulsating flow produced during movement of the spool 40f.

In the valve housing 40a, there is further formed an oil passage 40v connecting the chamber 40r with the control port 40d. A piston 40w is slidably received in one end portion of the oil passage 40v, and abuts on the end surface of the large diameter section 40l of the spool 40f. In the control port 40d, there is provided an orifice Oc for producing a damping force against a sharp pressure change.

When the proportional solenoid 40o is not energized, the spool 40f assumes an initial position shown in FIG. 7, by force of the return spring 40n. In this initial position, the control port 40d is shut off from the input port 40b by the large diameter section 40h, and from the drain port 40c by the large diameter section 40i. When a current is supplied to the coil 40q, the plunger 40p moves leftwards in FIG. 7 in proportion to the magnitude of the supplied current, and causes the spool 40f to move in the same (left) direction against the return spring 40n. Therefore, the large diameter section 40h of the spool 40f opens a fluid communication between the input port 40b and the control output port 40d, so that the pressure in the control output port 40d is increased. This pressure increase in the control port 40d causes the piston 40w to move rightwards in FIG. 7. Therefore, the spool 40f returns to the initial position when the control pressure Pc in the control port 40d reaches a value corresponding to the value of the exciting current of the solenoid 40o.

Figure 8:
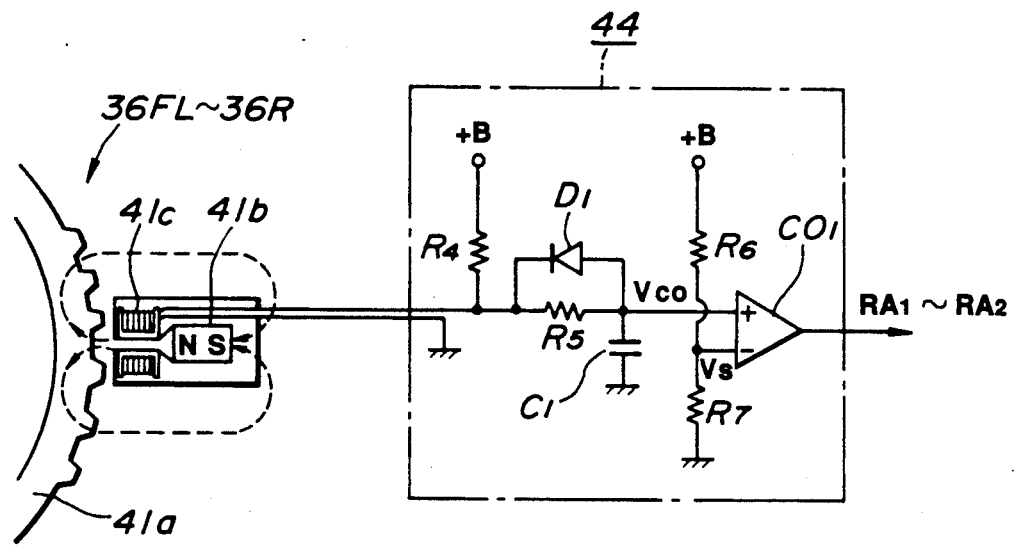
FIG. 8 is a circuit diagram showing a circuit 44 for detecting an abnormality in a rotation sensor, employed in the first embodiment.

Each of the front rotation sensors 36FL and 36FR and the rear rotation sensor 36R includes a rotor 41a, a magnet 41b and a coil 41c, as shown in FIG. 8. The rotors 41a of the rotation sensors 36FL, 36FR and 36R are mounted, respectively, on the left and right front axle shafts 9, and the rear drive shaft 10. In each rotation sensor, the rotor 41a has a periphery formed with a serration, and the magnet 41b confronts the periphery of the rotor 41a. The coil 41c senses an induced electromotive force due to the magnetic flux of the magnet 41b. The electromotive force having a frequency corresponding to the rotational speed of the rotor 21a is delivered from the coil 41c to the controller 50.

The lateral acceleration sensor 37 produces a voltage signal $Y_G$ corresponding to the lateral acceleration produced in the vehicle body, and sends this signal to the controller 50. The crank angle sensor 38 produces a voltage signal $C_D$ corresponding to the crank angle of the engine, and sends this signal to the controller 50.

Each rotation sensor 36FL, 36FR or 36R is connected with a rotation sensor abnormality detection circuit 44 for detecting an abnormal condition in the associated rotation sensor. There are further provided three other abnormality detection circuits 45, 46 and 47. The abnormality detection circuit 45 is connected with the lateral acceleration sensor 37 for detecting an abnormal condition thereof. The circuit 46 is a motor abnormality detection circuit for detecting an abnormal condition in the electric motor 35a and the motor relay 35h of the hydraulic unit 35. The circuit 47 is designed to detect an abnormality in the proportional solenoid 35g of the pressure control valve 35f.

Each rotation sensor abnormality detection circuit 44 has resistors R4, R5, R6 and R7, a diode D1, a charge and discharge capacitor C1 and a comparator CO1, as shown in FIG. 8. One end of the coil 41c of the associated rotation sensor 36FL, 36FR or 36R is connected through the resistor R4 to the positive power source terminal B, and the other end of the coil 41c is connected to the ground. The diode D1 and the resistor R5 are connected in parallel. One end of this parallel circuit consisting of the diode D1 and the resistor R5 is connected to a branch point between the resistor R4 and the coil 41c. The other end of the parallel circuit is connected to one end of the charge and discharge capacitor C1, the other end of which is connected to the ground. A terminal voltage Vco between both terminals of the capacitor C1 is inputted to the noninverting input terminal of the comparator CO1. The resistors R6 and R7 are connected in series to form a voltage divider between the positive power source terminal B and the ground. A predetermined standard voltage Vs obtained from an intermediate tap of the voltage divider is inputted to the inverting input terminal of the comparator CO1. The comparator CO1 outputs a rotation sensor abnormality detection signal RA1, RA2 or RA3 of the logical value "1" when the terminal voltage Vco of the capacitor C1 is equal to or higher than the standard voltage Vs.

When the associated rotation sensor 36FL, 36FR or 36R is normal, the capacitor C1 is charged and discharged repeatedly by the alternating electromotive force induced in the coil 41c. Therefore, the terminal voltage Vco of the capacitor C1 cannot become equal to or higher than the standard voltage Vs, and the output signal RA1, RA2 or RA3 of the comparator CO1 remains equal to the logical value "0". If the wire of the coil 41c is broken, then the capacitor C1 is charged by the voltage of the positive power source B, and the terminal voltage of the capacitor C1 is increased with time. After the elapse of a time length (0.5 sec., for example) corresponding to the time constant determined by the resistance of the resistor R5 and the capacitance of the capacitor C1, the terminal voltage Vco of the capacitor C1 becomes equal to or higher than the standard voltage Vs, and the comparator CO1 sends the abnormality detection signal RA1, RA2 or RA3 of the logical value "1", to the controller 50.

Figure 9:
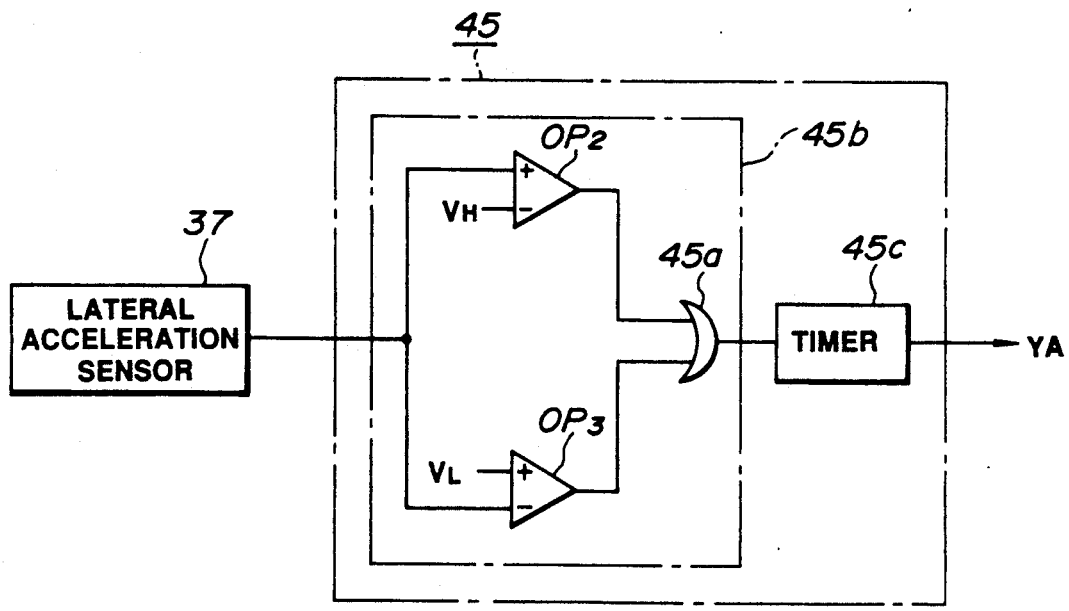
FIG. 9 is a diagram showing a circuit 45, employed in the first embodiment, for detecting an abnormality in a lateral acceleration sensor 37.

The lateral acceleration sensor abnormality detection circuit 45 has a window comparator 45b consisting of two operational amplifiers OP2 and OP3 and an OR circuit 45a, and a timer circuit 45c, as shown in FIG. 9. The inverting input terminal of the operational amplifier OP2 receives a predetermined high level voltage VH corresponding to an upper limit of the acceleration (+1.2 G, for example). The noninverting input terminal of the operational amplifier OP3 receives a predetermined low level voltage VL corresponding to a lower limit of the acceleration (−1.2 G, for example). The noninverting input terminal of the operational amplifier OP2 and the inverting input terminal of the operational amplifier OP3 are both connected with the lateral acceleration sensor 37. The outputs of the operational amplifiers OP2 and OP3 are inputted into the OR circuit 45a, and the output of the OR circuit 45a is inputted to the timer circuit 45c.

When the lateral acceleration sensor 37 is normal, the lateral acceleration signal $Y_G$ is between VL and VH. That is, $VL \leq Y_G \leq VH$. Therefore, the OR circuit 45a of the window comparator 45b delivers the output signal of the logical value "0". If the lateral acceleration sensor 37 becomes abnormal, and produces the signal $Y_G$ which is outside the normal range of the acceleration bounded by VL and VH (that is, $Y_G < VL$ or $VH < Y_G$), then the OR circuit 45a delivers the signal of the logical value "1". If the abnormal condition persists and the output signal of the window comparator 45b continues to be the logical value "1" for a predetermined time interval of the timer circuit 45c, then timer circuit 45c produces a lateral acceleration sensor abnormality detection signal YA of the logical value "1" at the end of the predetermined time interval (0.5 sec, for example). This abnormality detection signal YA is sent to the controller 50.

Figure 10:
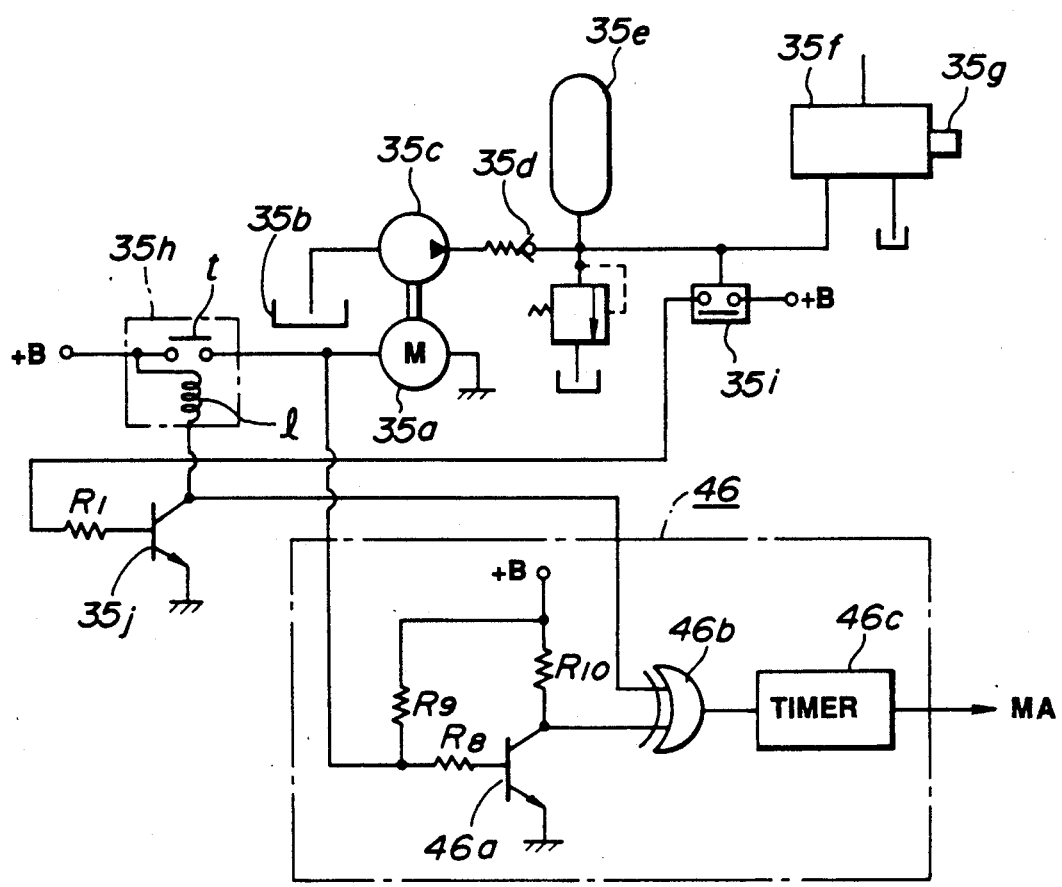
FIG. 10 is a diagram showing a circuit 46, employed in the first embodiment, for detecting an abnormality in a motor 35a for driving an oil pump 35c.

The motor abnormality detection circuit 46 has, as shown in FIG. 10, three resistors R8, R9 and R10, a switching transistor 46a, an exclusive OR circuit 46b, and a timer circuit 46c. The switching transistor 46a has a base which is connected through the resistor R8 to a branch point between the electric motor 35a and the motor relay 35h and which is further connected through the resistors R8 and R9 to the positive power source B, a collector which is connected through the resistor R10 to the positive power source B, and an emitter connected to the ground. The exclusive OR circuit 46b has a first input terminal for receiving the collector voltage of the switching transistor 46a, a second input terminal for receiving the collector voltage of the switching transistor 35j of the hydraulic unit 35, and an output terminal connected to the timer circuit 46c. The timer circuit 46c produces a motor abnormality detection signal MA of the logical value "1" if the output signal of the exclusive OR circuit 46b continues to be "1" for a predetermned time duration, 0.5 sec, for example.

When the motor 35a and the motor relay 35h are both normal, and the motor relay 35h is held in the on state by the pressure switch 35i in the on state, then the collector voltage of the switching transistor 35j is at the low level, and at the same time the switching transistor 46a is put in the on state, so that its collector voltage is also at the low level. Therefore, the output signal of the exclusive OR circuit 46b remains "0" to indicate that the motor 35a and the relay 35h are normal. When the pressure switch 35i and the switching transistor 35j are in the off state, then the collector voltage of the switching transistor 35j is at the high level, and at the same time, the switching transistor 46a is put in the off state and increases the collector voltage to the high level because the positive power source B connected through the resistors R8 and R9 is connected to the base through the motor 35a to the ground. Therefore, the exclusive OR circuit 46 provides the output signal of the logical value "0" to indicate the normality.

If the wire of the coil of the motor relay 35h is broken, then the collector voltage of the switching transistor 35j is reduced to the low level, and the switching transistor 46a is turned off, so that its collector voltage is increased to the high level. Consequently, the exlusive OR circuit 46b produces the output signal of the logical value "1" to indicate the abnormality. If the wire of the coil of the electric motor 35a is broken during the off period of the pressure switch 35i, then the switching transistor 35j is in the off state in which its collector voltage is high, but the switching transistor 46a is put in the on state, so that its collector voltage becomes low. Consequently, the exclusive OR circuit 46b produces the output signal of the logical value "1" to indicate the abnormality. If the motor 35a continues rotating because of seizure of the contacts of the motor relay 35h during the off period of the pressure switch 35i, then the collector voltage of the switching transistor 35j is high because the switching transistor 35i is in the off state, and the collector voltage of the switching transistor 46a is low because the transistor 46a is turned on. Consequently, the exclusive OR circuit 46b produces the output signal of the logical value "1" to indicate the abnormality. If the coil of the motor 35a is broken during the on period of the pressure switch 35i during which the switching transistor 35j is in the on state, and its collector voltage is low, then the switching transistor 46a is in the on state and its collector voltage is also low. Therefore, the exclusive OR circuit 46b produces the output signal of the logical value "0" in spite of the abnormal condition in the motor 35a. However, the circuit 46 can detect the broken connection when the pressure of the accumulator 35e decreases and the pressure switch 35i turns off.

If the output signal of the exclusive OR circuit 46b continues to be "1" for a predetermined time interval, 0.5 sec., for example, because of an abnormal condition in the motor 35a or the motor relay 35h, then the timer circuit 46 delivers a motor abnormality detection signal MA of the logical value "1" to the controller 50 at the end of the predetermined time interval.

Figure 11:
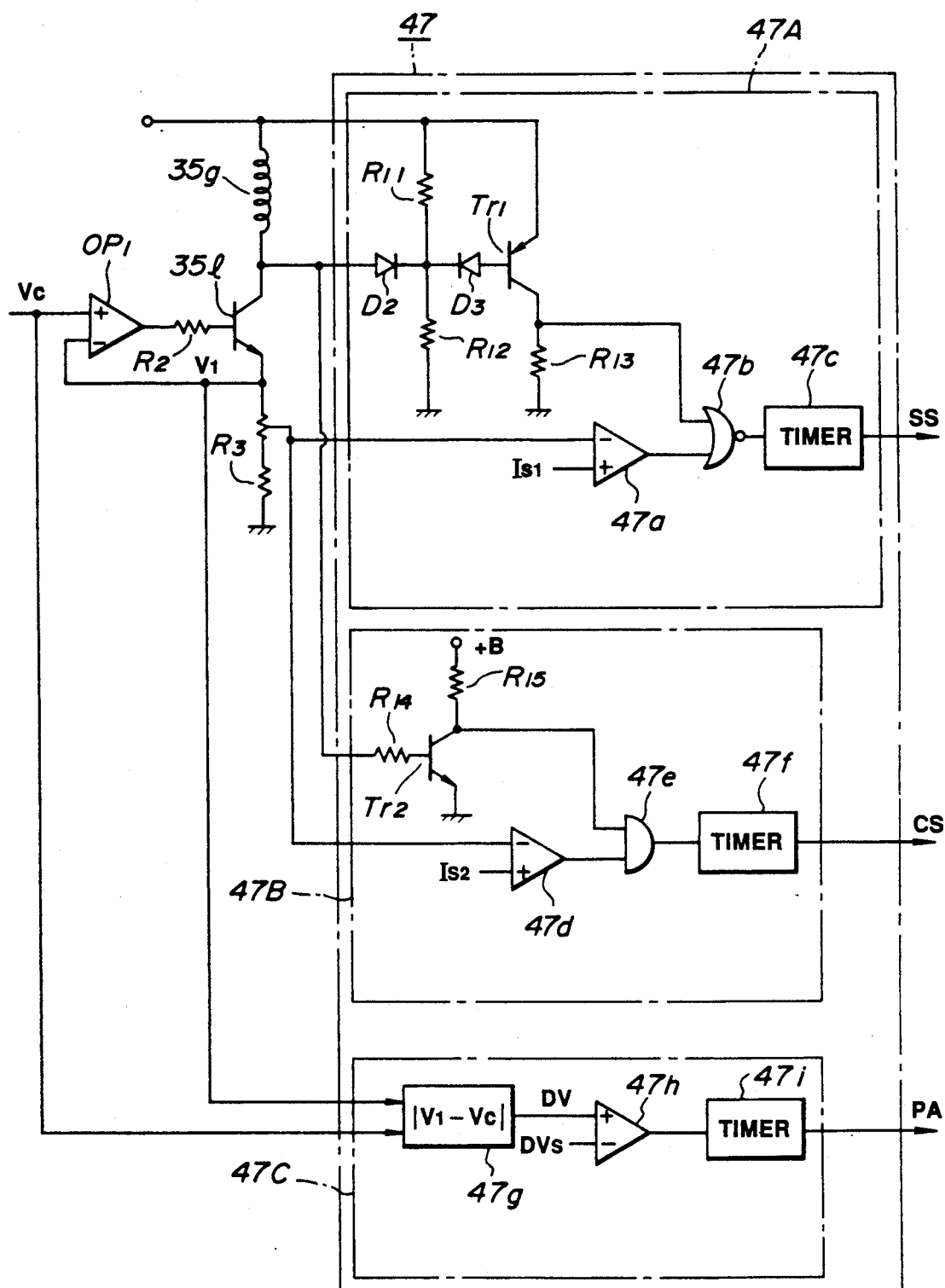
FIG. 11 is a diagram showing a circuit 47, employed in the first embodiment, for detecting various abnormalities in a solenoid 35g of the pressure control valve 35f.

The solenoid abnormality detection circuit 47 has a first section 47A for detecting a short-circuit in the proportional solenoid 35g of the pressrue control valve 35f, a second section 47B for detecting a broken connection in the proportional solenoid 35g, and a third section for detecting an abnormality in the power supply to the proportional solenoid 35g, as shown in FIG. 11.

The first section 47A has a voltage divider consisting of resistors R11 and R12 of relatively high resistances, a series circuit consisting of a PNP transistor Tr1 and a resistor R13, two diodes D2 and D3, a comparator 47a, a NOR circuit 47b and a timer circuit 47c. The voltage divider of R11 and R12, and the series circuit of Tr1 and R13 are both parallel with the series circuit comprising of the proportional solenoid 35g, the power transistor 35l and the resistor R3. The branch point between the proportional solenoid 35g and the power transistor 35l is connected through the diode D2 with the branch point between the resistors R11 and R12 of the voltage divider. This branch point between R11 and R12 is connected through the diode D3 with the base of the transistor Tr1. A collector current of the power transistor 35l is inputted to one input terminal of the comparator 47a, the other input terminal of which is arranged to receive a predetermined current Is1. The output of the comparator 47a and the collector voltage of the transistor Tr1 are inputted to the NOR circuit 47b. The timer circuit 47c receives the output of the NOR circuit 47b, and produces a short detection signal SS if the output of the NOR circuit 47b continues to be the logical value "1" longer than a predetermined time interval, 0.5 sec, for example. The resistrance values of the resistors R11 and R12 are sufficiently higher than a resistance value r of the proportional solenoid 35g.

When the proportional solenoid 35g is normal, and the command curent Iso1 through the solenoid 35g is relatively great, then the voltage drop across the proportional solenoid 35g is relatively high, and the switching transistor Tr1 is in the on state, so that the collector voltage of the transistor Tr1 is at the high level. At the same time, the solenoid current Iso1 flowing through the emitter of the power transistor 35l is relatively great, and the output of the comparator 47a is at the low level. Therefore, the NOR circuit 47b produces the output signal of the logical value "0" to indicate the normality.

When the transfer clutch 23 is to be disengaged, a clutch engagement force $T_M$ is approximately equal to zero, and a command voltage Vc consists only of a dither signal, as mentioned later. Therefore, the command current Iso1 through the solenoid 35g is very low, and the switching transistor Tr1 is turned off if the voltage drop across the proportional solenoid 35g is lower than the base-emitter voltage $V_{BE}$ required to turn on the switching transistor Tr1. In this case, however, the command current Iso1 inputted into the comparator 47a is lower than the predetermined current Is1, and the output of the comparator 47a is set at the high level. Consequently, the NOR circuit 47b produces the output signal of the logical value "0" to indicate the normality.

If the continuity in the solenoid 35g is lost because of a broken connection, then the switching transistor Tr1 is turned on, and its collector voltage becomes high. However, the current flowing through the emitter of the power transistor 35l becomes equal to zero, and the comparator 47a produces the output of the high level. Consequently, the NOR circuit 47b produces the output signal of the logical value "0" even if a broken connection occurs in the solenoid 35g.

If a short-circuit occurs in the proportional solenoid 35g, then the switching transistor Tr1 is turned off, and its collector voltage is decreased to the low level. If, in this state, the current through the emitter of the power transistor 35l becomes equal to or higher than the preset current Is1, then the output of the comparator 47a becomes low, and consequently the NOR circuit 47b produces the output signal of the logical value "1". In this way, the first section 47A can detect a short-circuit. The timer circuit 47c produces a short detection signal SS and sends it to the controller 50 if the output signal of the NOR circuit 47b continues to be the logical value "1" longer than the predetermined time interval.

The second section 47B of the solenoid abnormality detection circuit 47 has resistors R14 and R15, a switching transistor Tr2, a comparator 47d, and AND circuit 47e and a timer circuit 47f. The switching transistor Tr2 has a base receiving the collector voltage of the power transistor 35l through the resistor R14, a collector connected through the resistor R15 to the positive power source B, and an emitter connected to the ground. The comparator 47 has an inverting input terminal receiving the emitter current of the power transistor 35l, a noninverting input terminal receiving a preset current Is2, and an output terminal connected to one input terminal of the AND circuit 47e. The other input terminal of the AND circuit 47e is arranged to receive the collector voltage of the transistor Tr2. The timer circuit 47f receives the output signal of the AND circuit 47e, and produces a broken connection detection signal CS of the logical value "1" if the output signal of the AND circuit 47e continus to be equal to the logical value "1" longer than a predetermined time interval, 0.5 sec., for example.

When the proportional solenoid 35g is normal and free from any broken connection, and the power transistor 35l is out of the saturation on state, then the transistor Tr2 is in the on state, and its collector voltage is at the low level. Therefore, the AND circuit 47e holds its output signal equal to the logical value "0" to indicate the normality irrespective of the level of the output signal of the comparator 47d.

When the power transistor 35l comes to the saturation on state, its collector voltage becomes low and the transistor Tr2 turns off in some cases. In this case, the emitter current of the power transistor 35l is higher than the preset current Is2 because the power transistor 35l is in the on state. Therefore, the output of the comparator 47d is at the low level, and the output of the AND circuit 47e remains equal to the logical value "0".

If the continuity of the solenoid 35g is lost because of a broken connection, then the transistor Tr2 turns off, so that its collector voltage becomes high, and at the same time, the current flowing through the power transistor 35l is reduced to zero. Therefore, the output of the comparator 47d becomes high, and the output of the AND circuit 47e is changed to the logical value "1" to signal the presence of a broken connection. If the duration for which the output of the AND circuit 47e remains equal to the logical value "1", becomes equal to or longer than the predetermined time length, then the timer circuit 47f produces a broken connection detection signal CS of the logical value "1" and sends it to the controller 50.

The third section 47C of the solenoid abnormality detection circuit 47 has an operation circuit 47g, a comparator 47h and a timer circuit 47i. The operation circuit 47g receives the emitter voltage V1 of the power transistor 35l and a command voltage Vc produced by the controller 50, and calculates a deviation DV ($= |V_1 - Vc|$) which is the absolute value of a difference between the two input voltages. The comparator 47b compares the deviation DV outputted from the operation circuit 47g, with a preset allowable deviation DVs. The timer circuit 47i produces a power supply abnormality detection signal PA of the logical value "1" if the output of the comparator 47h continues to be the logical value "1" longer than a predetermined time interval, 0.5 sec., for example.

When the power transistor 35l is normal, then the deviation DV of the operation circuit 47g is smaller than the predetermined deviation DVs, and the output of the comparator 47h is "0". If the power transistor 35l is abnormal, and the collector voltage of the transistor 35l deviates too much relative to the command voltage Vc, then the deviation DV determined by the operation circuit 47g becomes greater than the predetermined deviation DVs, and the comparator 47h produces the output signal of the logical value "1" to signal the occurrence of the abnormality. If this abnormal condition continues longer than the predetermined time interval, then the timer circuit 47i produces the power supply abnormality detection signal PA of the logical value "1", and sends it to the controller 50.

The controller 50 includes a first clutch engagement force calculating section 51 for calculating a first clutch engagement force $T_M$ in accordance with the output signals of the rotation sensors 21FL, 21FR and 21R and the lateral acceleration sensor $Y_G$, a clutch engagement force decreasing section 52 for decreasing the clutch engagement force, a second clutch engagement force calculating section 33 for calculating a second clutch engagement force $T_{ABS}$ in accordance with the output signal of the crank angle sensor 38, a fail-safe section 55 for producing first and second abnormality signals $AB_1$ and $AB_2$ in accordance with the signals of the abnormality detection circuits 44-47, an analog multiplexer (selector) 56 for selecting one of the various magnitudes of the clutch engagement force in accordance with the abnormality signals, and an output section 57 for driving the solenoid 35g of the hydraulic unit 35 in accordance with the output of the analog multiplexer 36.

The first clutch engagement force calculating section 51 includes three circuits 61FL, 61FR and 61R for calculating a wheel speed (peripheral speed) $Vw_{FL}$ of the front left wheel 2FL, a wheel speed $Vw_{FR}$ of the front right wheel 2FR, and a wheel speed $Vw_R$ of the rear wheels, a circuit 62 for calculating a front and rear wheel speed difference DVw, a circuit 64 for receiving the lateral acceleration $Y_G$ from the lateral acceleration sensor 22Y through an input filter 63 and determining a gain K in accordance with the lateral acceleration $Y_G$, and a circuit 65 for calculating the first clutch engagement force $T_M$ in accordance with the speed difference DVw and the gain K. The wheel speed calculating circuits 61FL, 61FR and 61R, respectively, receive the numbers of revolutions $n_{FL}$, $n_{FR}$ and $n_R$, and determines the wheel speeds (peripheral speeds) $Vw_{FL}$, $Vw_{FR}$ and $Vw_R$ from the number of revolutions, and the radius of each wheel. The front and rear wheel speed difference calculating circuit 62 determines the front and rear wheel speed difference DVw between the front wheel speed and the rear wheel speed, from the front left and front right wheel speeds $Vw_{FL}$ and $Vw_{FR}$ and the rear wheel speed $Vw_R$ in accordance with the following equation (2).

$$DVw = 2Vw_R - Vw_{FL} - Vw_{FR} \qquad (2)$$

The gain K determined by the gain calculating circuit 64 is proportional to the reciprocal of the lateral acceleration $Y_G$ ($K = a/Y_G$ where a is a constant). The first clutch engagement force calculating circuit 65 determines the first clutch engagement force $T_M$ by multiplying the absolute value of the front and rear wheel speed difference DVw determined by the circuit 62, by the gain K determined by the circuit 64. That is, $T_M = R \times |DVw|$.

Figure 12:
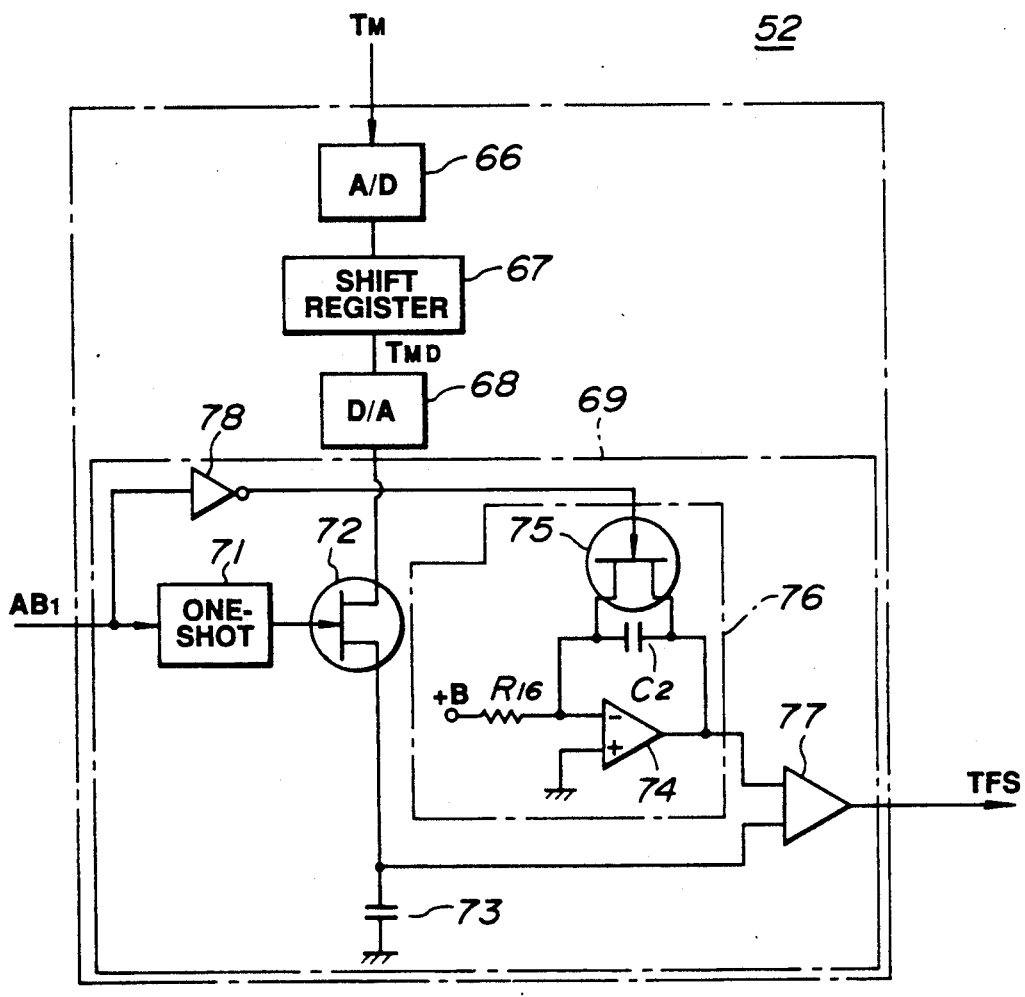
FIG. 12 is a block diagram showing a clutch engagement force decreasing section 52 of the controller 50 of the first embodiment.

The clutch engagement force decreasing section 52 includes, as shown in FIG. 12, an analog-to-digital converter 66, a shift register 67, a digital-to-analog converter 68, and a clutch engagement force decreasing circuit 69. The A/D converter 46 receives the first engagement force $T_M$ from the circuit 65, and converts it from an analog signal to a digital signal. The shift register 67 successively stores values of the digital signal outputted from the A/D converter 66, and outputs a delayed clutch engagement force $T_{MD}$ at an instant delayed by the predetermined time interval (0.5 sec) corresponding to the interval of the abnormality detection circuits. The delayed clutch engagement force $T_{MD}$ of the shift register 67 is inputted through the D/A converter 68 into the clutch engagement force decreasing circuit 69.

The clutch engagement force decreasing circuit 69 includes a field-effect transistor 72 serving as an analog switch, an integrator 76 and an adder 77, as shown in FIG. 12. The field-effect transistor 72 has a drain receiving the delayed clutch engagement force $T_{MD}$ of the analog form from the D/A converter 68, a gate receiving the first abnormality detection signal $AB_1$ from the fail-safe section 55 through a one-shot multivibrator (monostable multivibrator) 71, and a source which is connected to the ground through a charging capacitor 73. The integrator 76 has an operational amplifier 74 having an inverting input connected with the positive power source B through a resistor $R_{16}$, and a noninverting input connected to the ground. Between the inverting input and output of the operational amplifier 74, there is connected a parallel combination of a capacitor $C_2$ and a field-effect transistor 75. The adder 77 adds a voltage of the charging capacitor 73, and an output voltage of the integrator 76. The first abnormality detection signal $AB_1$ of the fail-safe section 55 is inputted through an inverter 78 into the gate of the field-effect transistor 75 of the integrator 76.

The second clutch engagement force calculating section 53 includes an engine speed calculating circuit 81a and a second clutch engagement force calculating circuit 82b, as shown in FIG. 4. The engine speed calculating circuit 81 calculates an engine revolution speed $V_E$ of the engine 1 by using the crank angle signal $C_D$ sent from the crank angle sensor 38. The circuit 82 determines the second engagement force $T_{ABS}$ in accordance with the engine speed $V_E$ determined by the engine speed calculating circuit 81. The second clutch engagement force $T_{ABS}$ is increased linearly as $V_E$ increases.

$$T_{EB} = bV_E - c \tag{3}$$

Figure 14:
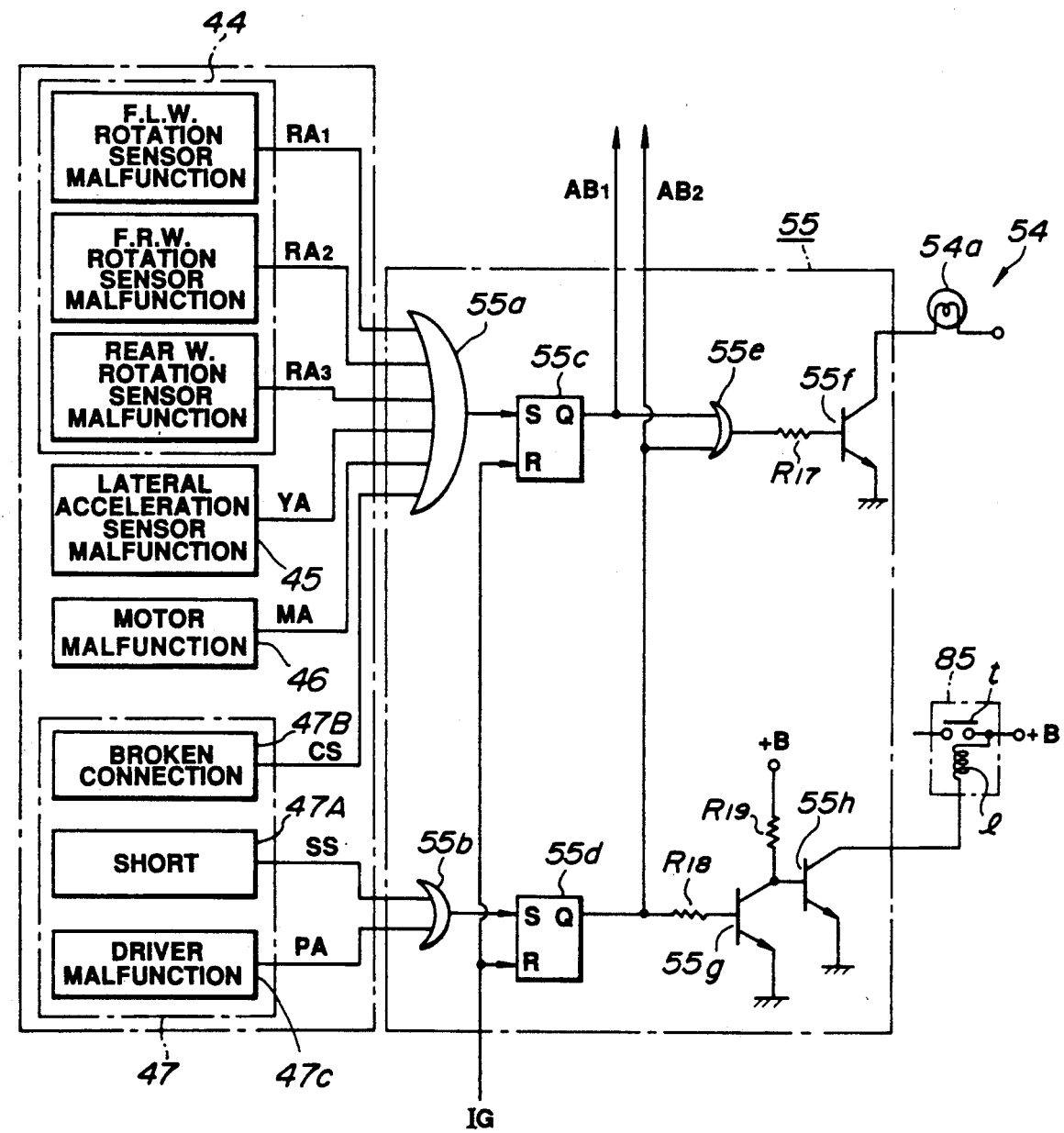
FIG. 14 is a block diagram showing a fail-safe section 55 of the first embodiment.

The fail-safe section 55 includes three OR circuits 55a, 55b and 55e, two RS flip-flops 55c and 35d, and three switching transistors 55f, 55g and 35h, as shown in FIG. 14. The first OR circuit 55a has first, second and third inputs receiving the rotation sensor abnormality detection signals $RA_1$, $RA_2$ and $RA_3$, respectively, from the abnormality detection circuit 44, a fourth input receiving the lateral acceleration abnormality detection signal YA from the detecting circuit 45, a fifth input receiving the motor abnormality detection signal MA from the detecting circuit 46c, and a sixth input receiving the broken connection detection signal CS from the circuit 47B. The second OR circuit 55b has a first input receiving the short detection signal SS from the circuit 47A, and a second input receiving the current supply abnormality detection signal PA from the circuit 47c. The first RS flip-flop 55c has a Set terminal receiving the output signal of the first OR circuit 55a, and a Reset terminal receiving an ignition-on signal IG from an ignition switch of the vehicle. The second RS flip-flop 55d has a Set terminal receiving the output signal of the second OR circuit 55b, and a Reset terminal receiving the ignition-on signal IG from the ignition switch. The third OR circuit 55e has two input terminals receiving the affirmative outputs (Q outputs) of the first and second flip-flops 55c and 55d. The first switching transistor 55f has a base receiving the output of the third OR circuit 55e through a resistor $R_{17}$, a collector connected to a warning lamp 54a of a warning circuit 54, and an emitter connected to the ground. The second switching transistor 55g has a base receiving the affirmative output (Q output) of the second flip-flop 55d through a resistor $R_{18}$, a collector connected to the positive power source B through a resistor $R_{19}$, and an emitter connected to the ground. The third switching transistor 55h has a base receiving the collector voltage of the second switching transistor 55g, a collector, and an emitter connected to the ground. The collector of the third switching transistor 55h is connected to the positive-power source B through a relay coil of a solenoid relay circuit 85 which is connected between the proportional solenoid 35g of the hydraulic unit 35 and the positive power source B. The affirmative (Q) output of the first flip-flop 55c is sent, as the first abnormality detection signal $AB_1$, to the clutch engagement force decreasing section 52, and the analog multiplexer 56. The affirmative (Q) output of the second flip-flop 55d is sent, as the second abnormality detection signal $AB_2$, to the analog multiplexer 56.

The analog multiplexer 35 has five data input terminals, and four select inputs. The first data input terminal is connected with the first clutch engagement calculating section 51 so as to receive $T_M$. The second data input terminal of the analog multiplexer 56 is connected with the output terminal of the clutch engagement decreasing section 52, for receiving the clutch engagement force $T_{FS}$ of the decreasing section 52. The third data input terminal is connected with a circuit 56a which supplies the analog multiplexer 56 with a minimum clutch engagement force $T_O$. The minimum clutch engagement force $T_O$ is fixed at zero, so that the transfer clutch 23, if $T_O$ is selected, is fully disengaged, and the drive system is put in the complete 2WD state. The fourth data input terminal is connected with the second clutch engagement force calculating section 53 so as to receive $T_{ABS}$. The fifth data input terminal is connected with a circuit 56b which supplies the multiplexer 56 with a maximum clutch engagement force $T_{4W}$. The maximum clutch engagement force $T_{4W}$ has a fixed value to fully engage the transfer clutch 23, and to bring the drive system to the complete 4WD state.

Into the four select input terminals of the analog multiplexer 56, the first and second abnormality detection signals $AB_1$ and $AB_2$ of the fail-safe section 55, an antiskid control signal MR produced by an antiskid brake control system of the vehicle to signal the period during which the antiskid system is in operation, and a manual select signal MS are, respectively, inputted as select control signals. The analog multiplexer 56 selects one of the five input signals inputted to the five data input terminals in accordance with the four control signals inputted into the four select input terminals, in the following manner. The analog multiplexer 56 selects the input signal $T_M$ inputted into the first data input terminal when all the four select control signals inputted to the select input terminals are at the logical "0" level, selects the clutch engagement force $T_{FS}$ of the decreasing section 52 when the first abnormality detection signal $AB_1$ of the logical value "1" is inputted from the fail-safe section 55, selects the zero clutch engagement force $T_O$ of the circuit 56a when the second abnormality detection signal $AB_2$ of the logical value "1" is inputted from the fail-safe section 55, selects the second clutch engagement force $T_{ABS}$ when the signals $AB_1$ and $AB_2$ are equal to the logical value "0" and the antiskid signal MR is equal to the logical value "1", and selects the maximum clutch engagement force $T_{4W}$ to fully engage the transfer clutch 23 when the manual select signal MS is inputted from an auto/manual selector switch. Then, the analog multiplexer 56 delivers the selected clutch engagement force to the output circuit 57.

The output circuit 57 includes an output filter 57a receiving the clutch engagement force selected by the analog multiplexer 56, a dither signal generating circuit 57b, and an adding circuit 57c for adding the outputs of the output filter 57a and the dither circuit 57b. The adding circuit 57c outputs, to the solenoid drive circuit 355, a command voltage Vc corresponding to the clutch engagement force.

The control system of the first embodiment is operated as follows:

When the key switch is turned on during parking, power is supplied to the controller 50, the abnormality detection circuits 44-47 and other components. In this case, the ignition-on signal IG produced by the turn-on of the ignition switch is inputted to the flip-flops 55c and 55d of the fail-safe section 55, so that both flip-flops are reset. If there is no abnormal condition in the sensors 36FL-36R and 37, and the motor 35a and the solenoid 35g of the hydraulic unit 35, then the abnormality signals $RA_1$-$RA_3$, YA, MA, CS, SS and PA are all equal to the logical value "0". In response to these zero signals of the abnormality detection circuits, the fail-safe section 55 holds the flip-flops 55c and 55d in the reset state, and the output of the OR circuit 55e equal to "0". Therefore, the switching transistor 55f turns off, and the warning lamp 54a remains extinguished. At the same time, the switching transistor 55g remains off, and the switching transistor 55h becomes on, so that the solenoid relay 85 is closed by energization of the relay coil, and one terminal of the proportional solenoid 35g of the pressure control valve 35f is connected to the positive power source terminal.

In this case, the first and second abnormality detection signals $AB_1$ and $AB_2$ of the fail-safe section 55 are both equal to the logical value "0". On the other hand, the antiskid control system holds the control signal MR indicating the operating period of the antiskid control, equal to the logical value "0" because the vehicle is in the parking state, and the antiskid control is out of operation.

Therefore, the analog multiplexer 56 selects the output $T_M$ of the section 51. In this case, the first clutch engagement force $T_M$ determined by the first clutch engagement calculating section 51 is equal to zero, and therefore, the output of the analog multiplexer 36 is zero. Because the vehicle is still in the parking state, the outputs $n_{FL}$, $n_{FR}$ and $n_R$ of the rotation sensors 36FL, 36FR and 36R are all equal to zero, so that the outputs $Vw_{FL}$, $Vw_{FR}$ and $Vw_R$ of the wheel speed calculating circuits 61FL, 61FR and 61R, and the output DVw of the wheel speed difference calculating circuit 62 are all equal to zero. Consequently, the first clutch engagement force $T_M$ calculated by the first clutch engagement calculating circuit 65 is equal to zero. Thus, the analog multiplexer 56 selects and delivers the zero clutch engagement force $T_M$ to the output section 57.

In the output section 57, the zero clutch engagement force $T_M$ is inputted through the output filter 57a to the adding circuit 57c. Therefore, the adding circuit 57c delivers only the dither signal of a relatively small amplitude and a high frequency, to the solenoid driver circuit 35k. In response to this dither signal, the solenoid driver circuit 35k drives the proportional solenoid 35g. In this case, the dither signal can cause the spool of the control valve 35f to vibrate minutely, but it cannot cause the output pressure of the control valve to rise. Therefore, the output pressure of the control valve 35f remains zero, and the transfer clutch 23 remains disengaged. Thus, the drive system is held in the rear two-wheel drive state in which the driving torque from the engine 1 is transmitted only to the rear wheels 2RL and 2RR.

When, in this state, the transmission 5 is connected, and the accelerator pedal is depressed, then the vehicle is started in the rear two wheel drive mode. If the road is paved and dry so that the friction coefficient is high, and the course of the vehicle is straight, then there is little or no difference in rotational speed between the rear wheels 2RL and 2RR driven by the engine, and the front wheels 2FL and 2FR which are not being driven. Therefore, in this case, the first clutch engagement calculating section 51 holds the first clutch engagement force $T_M$ approximately equal to zero, and the transfer clutch 23 remains disengaged to continue the two wheel rive mode.

Figures 13A, 13B, 13C, 13D:
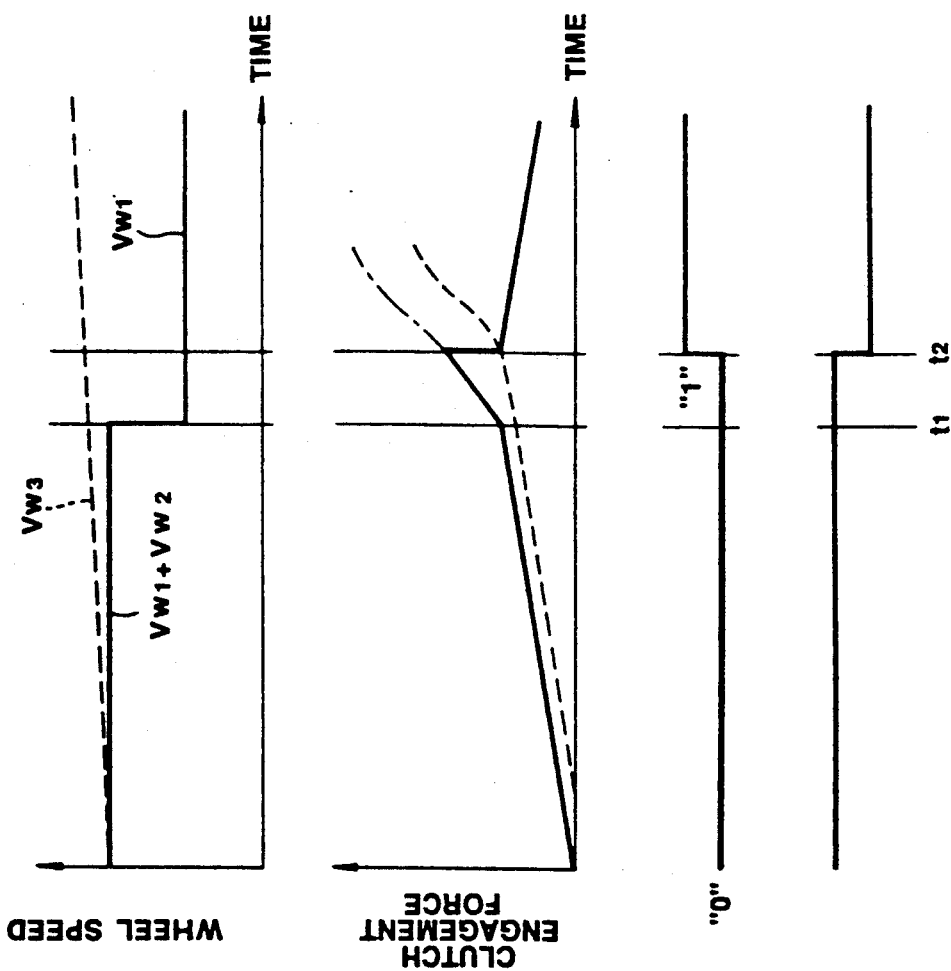
FIG. 13 is a time chart for illustrating operations of the control system of the first embodiment.

If the vehicle is accelerated hastily, or if the friction coefficient of the road surface becomes low because of snow, rain or some other factor, then the primary driving rear wheels 2RL and 2RR start slipping, so that the rear wheel speed becomes higher than the front wheel speed, and the front and rear wheel speed difference DVw determined by the circuit 62 increases from zero, as shown by a graph (a) of FIG. 13. Accordingly, the first clutch engagement calculating circuit 65 increases the first clutch engagement force $T_M$, as shown by a graph (b) in FIG. 13.

Therefore, the output section 57 provides a higher drive voltage, the solenoid drive circuit 35k increases the solenoid current Iso1 supplied to the proportional solenoid 35g by increasing the collector-emitter current of the power transistor 35l, the pressure control valve 35f increases the clutch engagement force of the transfer clutch 23 by increasing the control pressure, and the transfer clutch 23 increases the front wheel driving torque DT. In this way, the control system of this embodiment increases the tendency to 4WD, and ensures the stability of the vehicle even in unsafe situations.

When the vehicle is brought from such a straight ahead operation in the 4WD mode, to a cornering operation with a relatively large steering angle, then the turning movement of the vehicle produces the lateral acceleration $Y_G$, which is sensed by the lateral acceleration sensor 37Y. The sensed lateral acceleration $Y_G$ is inputted through the input filter 63 to the gain calculating circuit 64, which determines the gain K by using the equation $K = a/Y_G$ where a is a constant. Thus, the gain calculating circuit 64 decreases the gain K as the latral acceleration $Y_G$ increases.

The thus-decreased gain K is inputted to the first clutch engagement force calculating circuit 65, and used to determine the first clutch engagement force $T_M$ ($=K \times |DVw|$). Therefore, the first clutch engagement force calculating circuit 65 decreases the first clutch engagement force $T_M$, the solenoid drive circuit 35k decreases the solenoid current Iso1 supplied to the solenoid 35g, the pressure control valve 35f decreases the clutch engagement force of the transfer clutch 23, the transfer clutch 23 decreases the ratio of the front wheel driving torque to the total driving force and increases the ratio of the rear wheel driving torque, and the oversteering tendency of the vehicle is increased.

When the brake pedal is depressed to retard the vehicle hastily, then the antiskid control system comes into operation, and controls the braking forces applied to the four wheels 2FL-2RR, individually. During the antiskid brake control operation, the antiskid system holds the control signal MR equal to the logical value "1". In response to this control signal MR, the analog multiplexer 56 of the controller 50 selects the second clutch engagement force $T_{ABS}$ of the second clutch engagement force calculating section 53, instead of the first engagement force $T_M$. In the second calculating section 53, the engine speed calculating circuit 81 calculates the engine rotational speed $V_E$ in accordance with the output signal $C_D$ of the crank angle sensor 38, and the second clutch engagement calculating circuit 82 receives the engine speed $V_E$ from the circuit 81, and determines the second clutch engagement force $T_{ABS}$ by multiplying the engine speed $V_E$ by a predetermined constant b ($T_{ABS}=b \times V_E$). This second clutch engagement force is delivered through the analog multiplexer 56 and the output section 57, to the solenoid 35g of the control valve 35f. In this way, during the antiskid control operation, the control system of this embodiment employs $T_{ABS}$, and performs the driving force distribution control without receiving undesired influence of the antiskid control on the wheel speed difference.

If, for example, the rotation sensor 36FR becomes unable to produce the induced voltage because of occurrence of an abnormal condition at an instant $t_1$ shown in FIG. 13, then the wheel speed difference $DV_w$ outputted from the circuit 61 increases, and the first clutch engagement force $T_M$ of the circuit 65 is increased as shown by a solid line at (b) in FIG. 13.

In the rotation sensor abnormality detection circuit 44, the voltage of the capacitor C1 constituting a timer circuit is gradually increased because of the induced voltage being zero. When the voltage between both terminals of the capacitor C1 reaches the predetermined voltage at an instant $t_2$ after 0.5 sec., then the comparator CO1 outputs the rotation sensor abnormality detection signal $RA_2$ of the logical value "1", and sends it to the fail-safe section 55. In response to this signal $RA_2$, the OR circuit 55a of the fail-safe section 55 outputs the "1" output signal, and sets the flip-flop 55c. Therefore, the switching transistor 55f turns on, and lights the warning lamp 54a to attract the driver's attention to the abnormal condition. At the same time, the flip-flop 55c sends the first abnormality detection signal $AB_1$ of the logical value "1", as shown at (c) in FIG. 13, to the clutch engagement force decreasing section 52, and the analog multiplexer 56.

Therefore, the analog multiplexer 56 selects the fail-safe clutch engagement force $T_{FS}$ determined by the decreasing section 52, and supplies the signal representing $T_{FS}$ to the solenoid driver circuit 35k through the output circuit 57, and the pressure control valve 35f varies the clutch engagement force of the transfer clutch 23 in accordance with $T_{FS}$.

In this case, the clutch engagement force decreasing section 52, in response to the first abnormality detection signal $AB_1$, holds the field-effect transistor 72 in the on state during the predetermined interval set by the one-shot multivibrator 71, and charges the capacitor 73 with an analog voltage corresponding to an old value of the first clutch engagement force $T_M$ which was determined by the first clutch engagement force calcuting section 51, 0.5 second ago, at the instant at which the abnormality detection circuit 44 detected the abnormality in the rotation sensor 36FR, and which was stored into the shift register 67 through the A/D converter 66.

On the other hand, the field-effect transistor 75 provided in the integrating circuit 76 is turned off, as shown at (d) in FIG. 13 because of the change of the first abnormality detection signal $AB_1$ to the logical value "1". Accordingly, the integrating circuit 76 initiates the integration by using the predetermined voltage B as an initial value, and supplies the adder 77 with the integral output increasing in the negative direction with time.

Therefore, after the instant $t_2$, the adder 77 outputs the fail-safe clutch engagement force $T_{FS}$ which is the result of subtraction of the output of the integrating circuit 76 from the old value of the clutch engagement force $T_M$ charged in the capacitor 73 and which decreases gradually with time as shown by the solid line at (b) in FIG. 13.

The thus-determined fail-safe clutch engagement force $T_{FS}$ is transmitted through the analog multiplexer 56, and the output circuit 57 to the solenoid 35g of the pressure control valve 35f. Therefore, the control valve 35f gradually decreases the clutch engagement force of the transfer clutch 23 by gradually decreasing the outptu fluid pressure, and gradually decreases the driving force distribution ratio of the front wheels. In this way, the control system of this embodiment gradually changes the drive system from the 4WD state toward the 2WD state if an abnormality is detected in the rotation sensor. Therefore, the control system can prevent a spin of the vehicle due to decrease in the rear wheel cornering force, prevent an abrupt change in vehicle behavior, and improve the safety of the vehicle.

If the rotation sensor 36FL or 36R becomes abnormal, the rotation sensor abnormality detection circuit 44 produces the rotational sensor abnormality detection signal $RA_1$ or $RA_3$ of the logical value "1", and the clutch engagement force of the transfer clutch 23 is gradually decreased in the same manner.

If a failure occurs in the lateral acceleration sensor 37, the motor 35a of the hydraulic unit 35, or the motor relay 35h, or if a broken connection occurs in the solenoid 35g, then the OR circuit 55a of the fail-safe section 55 sets the flip-flop 55c, and the controller 50 gradually decreases the clutch engagement force of the transfer clutch 23 by using the fail-safe clutch engagement force $T_{FS}$ of the decreasing section 52 in the same manner.

If the solenoid 35g of the control valve 35f is short-circuited, the base-emitter voltage of the transistor Tr1 becomes approximately equal to zero, and the transistor Tr1 turns off, in the short detection circuit 47A of the solenoid abnormality detection circuit 47. In this state, the power transistor 35l turns on when the first clutch engagement force $T_M$ of the section 51 is relatively high. When the collector current of the power transistor 35l becomes higher than the preset current Is1, the output of the comparator 47a is changed to the low level, and the output of the NOR circuit 47a is changed to the high level. If this state continues longer than 0.5 sec., the timer circuit 47c delivers the short detection signal SS of the logical value "1", to the fail-safe section 55.

In response to the short detection signal SS, the OR circuit 55b produces the output signal of the logical value "1", and sets the flip-flop 55d. Therefore, the flip-flop 55d lights the warning lamp 54a, and brings the solenoid relay 85 to the off state by turning on the switching transistor 55g and turning off the switching transistor 55h. Thus, the curent supply to the solenoid 35g is shut off. The flip-flop 55d sends the second abnormality detection signal $AB_2$ to the analog multiplexer 56, which in turn selects the zero clutch engagement force of the circuit 56a.

In this way, the control system of the first embodiment immediately changes the drive system from the 4WD state to the 2WD state by immediately decreasing the output pressure of the control valve 35f to zero on the occurrence of a short-circuit of the solenoid 35g, and prevents damage of the solenoid 35g due to excessive current.

If an abnormal current flows through the solenoid 35g, then the current supply abnormality detection circuit 47c of the solenoid abnormality detection circuit 47 produces the current supply abnormality detection signal PA of the logical value "1", and sends it to the fail-safe section 55. Therefore, the OR circuit 55b of the fail-safe section 55 sets the second flip-flop 55d, and the control system immediately changes the drive system from the 4WD state to the 2WD state by shutting off the current supply to the solenoid 35g in the same manner. Thus, the control system of the first embodiment immediately shuts off the current supply to the solenoid 36g when an excessive current flows through the solenoid 39g.

Figure 15:
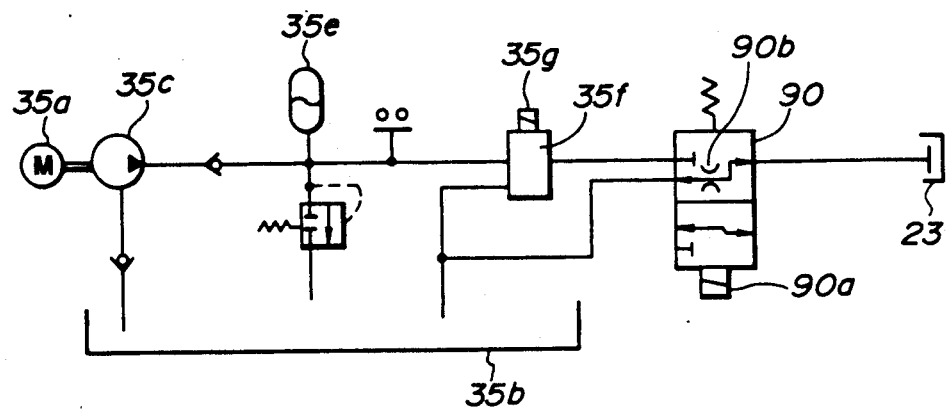
FIG. 15 is a diagram of a hydraulic system for showing a second embodiment of the present invention.

A second embodiment of the present invention is shown in FIG. 15. A control system of the second embodiment employs a hydraulic unit for gradually decreasing the clutch engagement force of the transfer clutch by gradually decreasing the control fluid pressure instead of the clutch engagement decreasing section 52 of the first embodiment.

As shown in FIG. 15, a solenoid operated fail-safe select valve 90 is disposed between the pressure control valve 35f and the input port 29 of the transfer clutch 23. The fail-safe select valve 90 is put in a first select position when a solenoid 90a of the select valve 90 is energized, and in a second select position when the solenoid 90a is not energized. In the first select position, the pressure control valve 35f is in fluid communication with the input port 29 of the transfer clutch 23. In the second select position, the input port 29 of the transfer clutch 23 is shut off from the control valve 35f by the select valve 90, and instead, the input port 29 is connected with the tank 35b through an orifice 90b.

Figure 16:
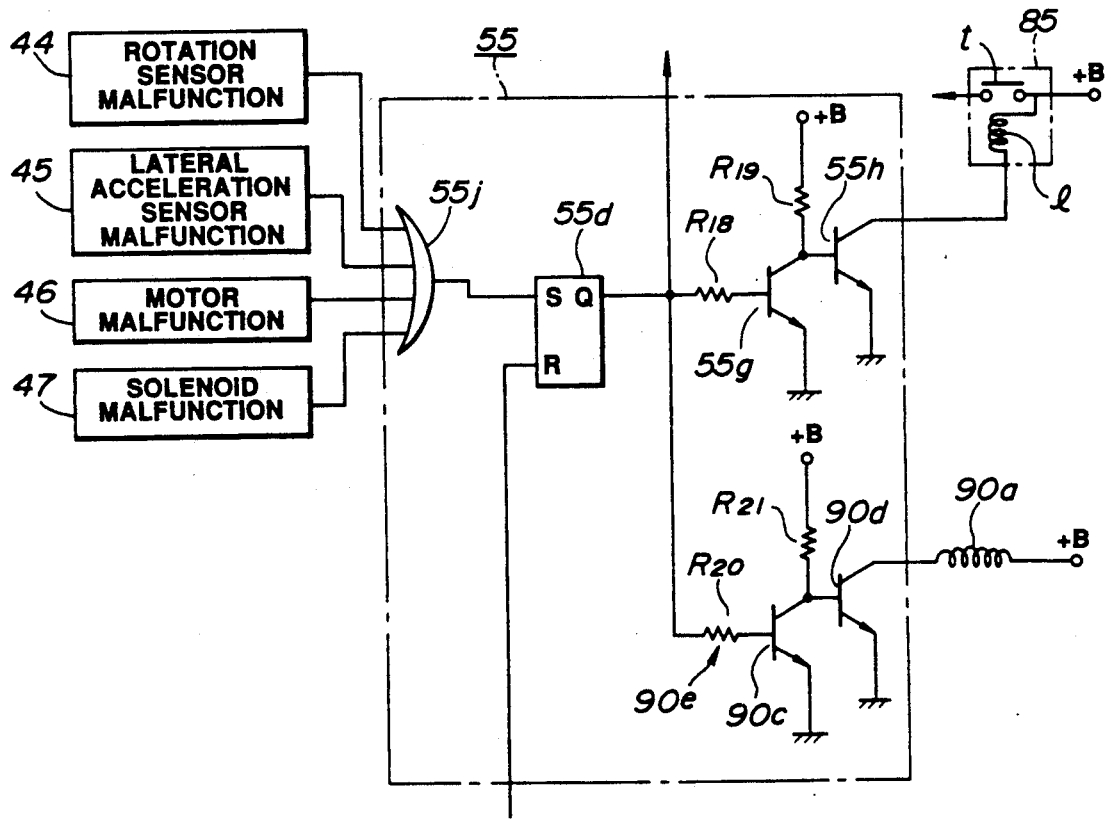
FIG. 16 is a digram showing a fail-safe section 55 of the second embodiment.

The solenoid 90a is controlled by a driver circuit 90e having switching transistors 90c and 90d, as shown in FIG. 16. The switching transistor 90c has a base connected through a resistor R20 with the Q outputer terminal of the flip-flop 55d of the fail-safe section 55, a collector connected through a resistor R21 with the positive power source B, and an emitter connected to the ground. The switching transistor 90d has a base connected with a branch point between the collector of the switching transistor 90c and the resistor R21, a collector connected with one end of the electromagnetic solenoid 90a, and an emitter connected to the ground. The other end of the solenoid 90a is connected to the positive power source B.

In the controller 50, the clutch engagement force decreasing section 52 is omitted. In the fail-safe section 55, as shown in FIG. 16, the flip-flop 55c is omitted, and the abnormality detection signals of the abnormality detection circuits 44–47 are all inputted to a single OR circuit 55j whose output terminal is connected to the set input terminal of the flip-flop 55d. The fail-safe section 55 of the second embodiment is arranged to bring the proportional solenoid 35g of the pressure control valve 35f to the deenergized state if any one or more of the output signals of the abnormality detection circuits 44–47 is changed to the logical value "1". In the other points, the control system of the second embodiment is substantially identical to the control system of the first embodiment.

When there is no abnormality, and accordingly the output signals of the abnormality detection circuits 45, 46, and 47 are all equal to the logical value "0", the flip-flop 55d of the fail-safe section 55 remains in the reset state. Therefore, the switching transistor 90c is in the off state, and the switching transistor 90d is in the on state, so that the solenoid 90a is in the energized state, and the select valve 90 is in the first select position in which the pressure control valve 35f is fluidly connected with the input port 29 of the transfer clutch 23. In this state, the controller 50 controls the engagement force of the transfer clutch 23 by controlling the output pressure of the control valve 35f in accordance with the clutch engagement force $T_M$ or $T_{ABS}$ calculated by the calculating section 51 or 53.

If any one (or more) of the abnormality detection circuits 44, 45, 46 and 47 detects an abnormal condition, and delivers the abnormality detection signal of the logical value "1" to the fail-safe section 55, then the OR circuit 55j produces the "1" output signal, and sets the flip-flop 55d. Therefore, the switching transistor 90c is turned on, and the switching transistor 90d is turned off, so that the solenoid 90a is put in the deenergized state, and the selector valve 90 is put in the second select position in which the input port 29 of the transfer clutch 23 is in fluid communication with the tank 35b through the orifice 90b having the restricted aperture. In this state, the fluid pressure in the transfer clutch 23 decreases gradually becuase of the resistance of the orifice 90b, and the drive system is gradually altered from the 4WD state to the 2WD state. Unlike the control system of the first embodiment, the control system of the second embodiment can vary the driving force distribution ratio gradually to the ratio corresponding to the 2WD state even in case of a short-circuit of the proportional solenoid 35g or an abnormality in the power supply of the solenoid 35g.

In the second embodiment, the orifice 90b is formed in the fail-safe valve 90. However, the orifice 90b for restricting the fluid flow can be disposed in the fluid passage between the select valve 90 and the fluid tank 35b, instead of within the select valve 90.

Figure 17:
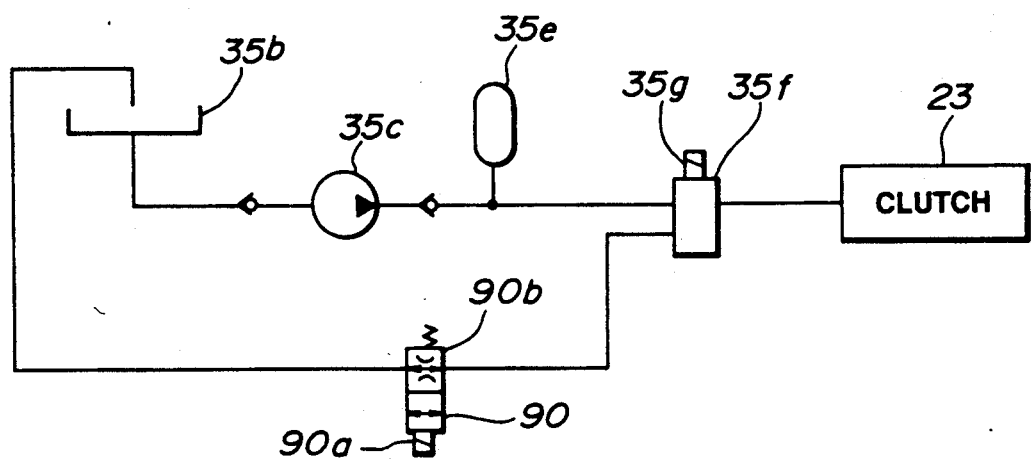
FIG. 17 is a diagram of a hydraulic system for showing a third embodiment of the present invention.

A thid embodiment of the present invention is shown in FIG. 17. In the third embodiment, the solenoid operated fail-safe select valve 90 is disposed between the drain port 40c of the pressure control valve 35f, and the fluid tank 35b. In the other points, the control system of the third embodiment is subsdtantially identical to that of the second embodiment.

When the rotation sensors, the lateral acceleration sensor and the other monitored components are normal, the Q output of the flip-flop 55d of the fail-safe section 55 is the logical value "0", the solenoid 90a is in the energized state, and the select valve 90 is in the first select position in which the drain port 40c of the pressure control valve 35f is in fluid communication with the tank 35b. Consequently, the pressure control valve 35f controls the clutch fluid pressure of the transfer clutch 23 in the normal mode in response to the control signal of the controller 50.

If any one (or more) of the rotation sensor abnormality detection circuit 44, the lateral acceleration sensor abnormality detection circuit 45, the motor abnormality detection circuit 46 and the solenoid abnormality detection circuit 47 detects an abnormal condition and delivers the abnormality detection signal of the logical value "1" to the fail-safe section 55, then the OR circuit 55j brings the flip-flop 55d to the set state by delivering the "1" signal to the Set terminal of the flip-flop 55d, in the same manner as in the fail-safe section 55 shown in FIG. 16. Consequently, the solenoid 35g of the pressure control valve 35f is in the deenergized state, the switching transistor 90C is in the on state, the switching transistor 90d is in the off state, the solenoid 90a of the select valve 90 is in the deenergized state, and the select valve 90 is in the second select position, in which the orifice 90b is interposed between the drain port 40c of the pressure control valve 35f and the tank 35b. In this state, the fluid pressure in the control port 40d of the pressure control valve 35f decreases gradually by the restricted fluid flow through the orifice 90b. In this way, the control system of the third embodiment can vary the driving force distribution ratio gradually to the safe value in case of a failure in the same manner as in the second embodiment.

Figure 18:
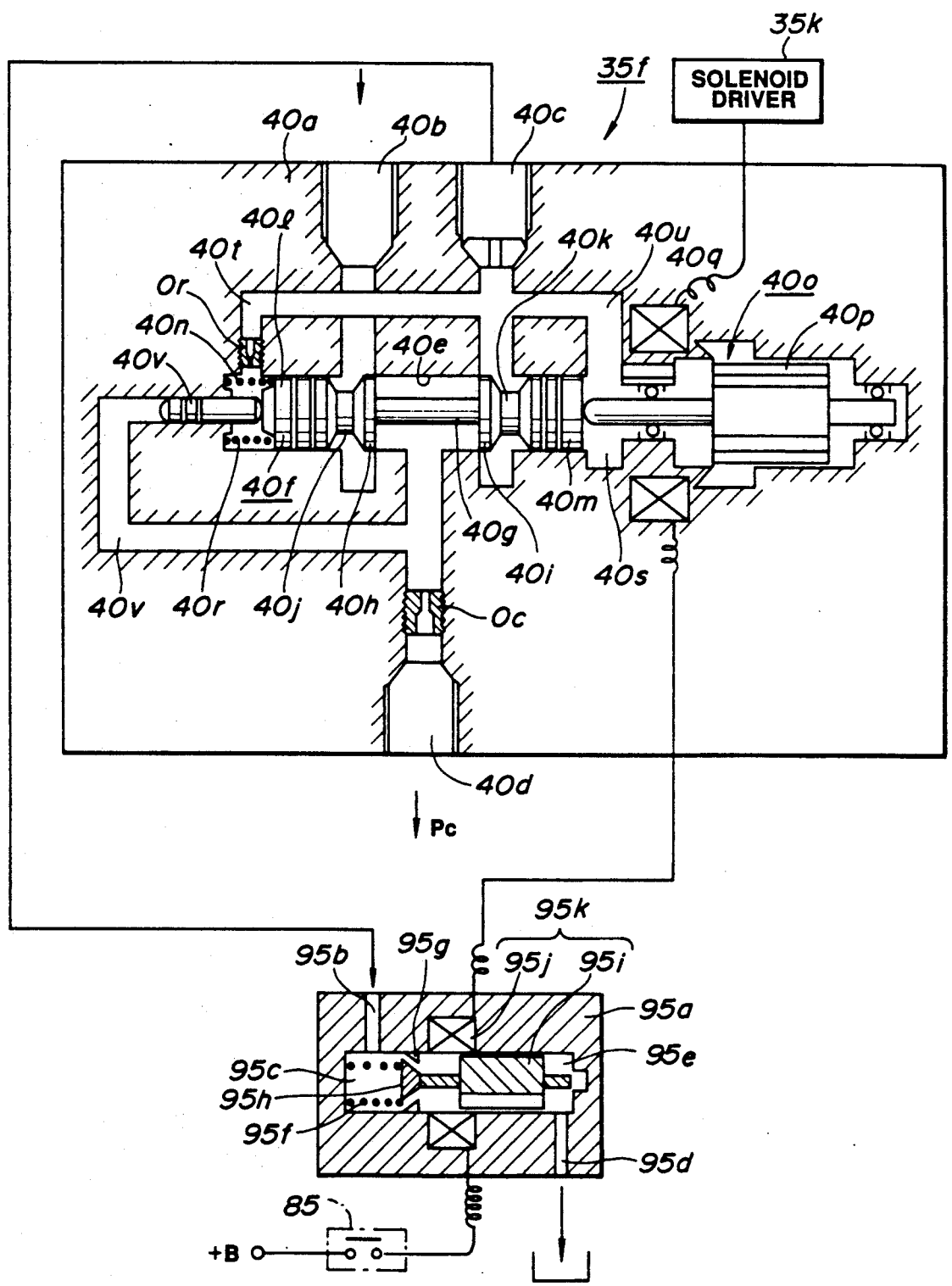
FIG. 18 is a sectional view of a fluid pressure control valve 35f and a fail-safe valve 90, for showing a fourth embodiment of the present invention.

A fourth embodiment of the invention is shown in FIG. 18.

In the fourth embodiment, the solenoid operated fail-safe select valve 90 is connected between the control valve 35f and the tank 35b as in the third embodiment. As shown in FIG. 18, the select valve 90 of the fourth embodiment has a valve housing 95a which is formed with an input port 95b connected with the drain port 40c of the pressure control valve 35f, a first pressure chamber 95c communicating with the input port 95b, an output port 95d connected with the tank 35b and a second pressure chamber 95e communicating with the output port 95d. Between the first and second pressure chambers 95c and 95e, there is provided a poppet 95h which is urged by a return spring 95f toward a valve seat 95g formed in the valve housing 95a. The fail-safe select valve 90 further has a solenoid 95k including a plunger 95i provided in the pressure chamber 95e for moving the poppet 95h, and a coil 95j. The spring force of the return spring 40n of the pressure control valve 35f is so determined that the spool 40f is moved at an exciting current higher than an exciting current actuating the plunger 95i of the fail-safe valve 90 against the return spring 95f. Accordingly, an offset value is added to each of the clutch engagement force $T_M$ and $T_{ABS}$ outputted from the controller 50. Furthermore, the solenoid driving relay 85, the solenoid 95k of the fail-safe valve 90 and the proportional solenoid 35g of the control valve 35f are connected in series between the positive power source B and the solenoid driver circuit 35k.

When there is no abnormality, and the output signals of the abnormality detection circuits 44-47 are all equal to "0", then the solenoid relay 85 is in the on state, and the predetermined offset voltage is outputted to the solenoid driver circuit 35k even if the clutch engagement force $T_M$ determined by the controller 50 is zero. Therefore, the proportional solenoid 35g and the fail-safe solenoid 90k of the fail-safe valve 90 are in the energized state. In this state, the poppet 95h of the fail-safe valve 90 is moved leftwards in FIG. 18 by the plunger 95i against the force of the return spring 95f, and the first and second pressure chambers 95c and 95e are brought in fluid communication with each other. Consequently, the drain port 40c of the control valve 35f is in fluid communication with the tank 35b, and the control valve 35f freely varies the engagement force of the transfer clutch 23 by varying the fluid pressure in accordance with the clutch engagement force $T_M$ or $T_{ABS}$ calculated by the calculating section 51 or 53 of the controller 50.

If any one (or more) of the abnormalitty detection circuit 44-47 detects an abnormal condition, and produces the abnormality detection signal of the logical value "1", then the flip-flop 55d of the fail-safe section 55 is brought to the set state, so that the switching transistor 90c is on, the switching transistor 90d is off, the solenoid driver relay 85 is off, and the proportional solenoid 35g and the fail-safe solenoid 95k are deenergized. Therefore, the spool 40f of the control valve 35f moves rightwardly in FIG. 18 by the force of the return spring 40n, and the control port 40d is connected with the drain port 40c. However, the poppet 90h of the fail-safe valve 90 moves rightwards by the force of the return spring 95f, and abuts on the valve seat 95g, so that the first and second pressure chambers 95c and 95e are shut off from each other. Thus, the fail-safe valve 90 prevents the oil pressure in the control port 40d of the control valve 35f from steeply decreasing, and by so doing prevents the engagement force of the transfer clutch 23 from steeply decreasing. Thereafter, the fluid pressure in the control port 40d of the control valve 35f gradually decreases because of leakage of the oil in the fail-safe valve 90, and the transfer clutch 23 gradually decreases its engagement force to bring the drive system gradually from the 4WD state to the 2WD state.

In the fourth embodiment, the retun spring of the control valve 35f is adjusted so that the output pressure of the control valve 35f is held at the minimum value corresponding to the zero clutch engagement force when the control current through the control solenoid 35g is lower than a predetermined first current value, and the output pressure increases linearly with increase of the control current when the control current is higher than the first value. The fail-safe value 90 is adjusted so that the fail-safe valve is in the fail-safe position when the current through the fail-safe solenoid is lower than a predetermined second current value which is equal to or lower than the first current value. Alternatively, it is possible to employ the relationship shown in FIG. 6, and to adjust the return spring of the transfer clutch so that the clutch engagement force remains zero until the clutch fluid pressure reaches a predetermined pressure value, and increases linearly with increase in the fluid pressure when the fluid pressure is higher than the predetermined value.

The present invention is applicable not only to a vehicle in which the rear wheels are the primary driving wheels, but it is also applicable to a vehicle in which the front wheels are the primary driving wheels. When the front wheels are primary and always connected with the output shaft of the transmission, the front and rear wheel speed difference DV is determined according to;

$$DV = 2V_{wF} - V_{wRL} - V_{wRR}$$

In the present invention, an electromagnetic clutch or a clutch of any other type can be used as the transfer clutch 23 as long as it can continuously vary a torque transmitted through itself.

It is possible to modify the hydraulic unit 35 in various manners. For example, the oil pump 20c may be driven by the engine 1 instead of the electrical motor. The pressure control valve 25f may be replaced by a pressure reducing valve, a relief valve, or some other control valve which can be controlled electrically and which can control the fluid pressure continuously.

The controller 50 of the present invention may be constructed in various manners. The controller 50 may be in the form of a combination of electronic circuits, or one or more microcomputers.

What is claimed is:

1. A fail-safe driving force distribution control system for a vehicle, comprising;

basic controlling means for varying a distribution of a driving force produced by a prime mover of said vehicle between front and rear axles of said vehicle, failure detecting means for producing a failure detection signal when a failure occurs in said basic means, and fail-safe means for gradually varying said distribution to a predetermined fail-safe state upon receipt of said failure detection signal.

2. A control system according to claim 1 wherein said basic means comprises a clutch for continuously varying said distribution by continuously varying a clutch engagement force, actuator means for varying said engagement force of said clutch in response to a control signal, and controller means for producing said control signal to control said distribution, and wherein said fail-safe means gradually decreases said engagement force of said clutch when said failure detection signal is produced.

3. A control system according to claim 2 wherein said failure detecting means comprises first detecting means for producing a first failure detection signal when a first failure is detected in said actuator means, and second detecting means for producing a second failure detection signal when a second failure is detected in said basic controlling means, and said fail-safe means comprises first decreasing means for immediately decreasing said engagement force of said clutch upon receipt of said first failure detection signal, and second decreasing means for gradually decreasing said engagement force upon receipt of said second failure detection signal.

4. A control system according to claim 3 wherein said basic means further comprises sensor means for sensing an operating condition of said vehicle, and said controller means controls said distribution in accordance with said operating condition, and wherein said second detecting means of said failure detecting means produces said second failure detection signal when a failure is detected in said sensor means.

5. A control system according to claim 4 wherein said actuator means comprises a fluid pressure control valve which comprises a control solenoid, and varies a clutch fluid pressure supplied to said clutch in accordance with a control current flowing through said control solenoid, and wherein said first detecting means of said failure detecting means comprises a circuit for detecting a short-circuit in said control solenoid.

6. A control system according to claim 4 wherein each of said first and second decreasing means decreases said control signal which is an electric signal, to decrease said engagement force of said clutch.

7. A control system according to claim 6 wherein said failure detecting means further comprises third detecting means for producing a third failure detection signal when a continuity of said control solenoid is lost, and said second decreasing means is actuated when at least one of said second and third failure detection signals is present.

8. A control system according to claim 2 wherein said fail-safe means comprises a fail-safe valve which is disposed between said clutch and drain means for draining a clutch fluid from said clutch, and which fluidly connects said clutch to said drain means through restricting means for restricting a fluid flow when said failure detection signal is present.

9. A control system according to claim 8 wherein said fail-safe valve comprises a fail-safe solenoid, and has a normal control position to allow said actuator means to vary said engagement force of said clutch in accordance with said control signal and a fail-safe position to connect said clutch to said drain means through said restricting means, said fail-safe valve being in said fail-safe position when said fail-safe solenoid is not energized.

10. A control system according to claim 9 wherein said actuator means comprises a fluid pressure control valve for varying a clutch fluid pressure supplied to said clutch in accordance with said control signal.

11. A control system according to claim 10 wherein said fail-safe valve is fluidly connected between said control valve and said clutch, said clutch being fluidly connected with said control valve when said fail-safe valve is in said normal control position, said clutch valve being shut off from said control valve and instead connected with said drain means through said restricting means when said fail-safe valve is in said fail-safe position.

12. A control system according to claim 10 wherein said fail-safe valve is fluidly connected between said control valve and said drain means, and said fail-safe valve interposes said restricting means between said control valve and said drain means to prevent said clutch fluid pressure from abruptly decreasing when said fail-safe valve is in said fail-safe position.

13. A control system according to claim 12 wherein said control valve comprises a control solenoid, and decreases said clutch fluid pressure as a control current flowing through said control solenoid decreases, and said fail-safe solenoid and said control solenoid are electrically connected in series.

14. A control system according to claim 13 wherein said engagement force of said clutch is equal to zero when said control current through said control solenoid is lower than a predetermined first current value, and increases in accordance with said control current when said control current is higher than said first current value, and said fail-safe valve is in said normal position when a current through said fail-safe solenoid is higher than a predetermined second current value which is equal to or lower than said first current value.

15. A control system according to claim 14 wherein said fail-safe means further comprises a solenoid driver relay which is electrically connected with said control solenoid and said fail-safe solenoid in series, and which is turned off when said failure detection signal is produced.

* * * * *